US012647161B2

(12) United States Patent
Kim et al.

(10) Patent No.: US 12,647,161 B2
(45) Date of Patent: Jun. 2, 2026

(54) DEVICE AND METHOD FOR BEAM MANAGEMENT IN COMMUNICATION SYSTEM

(71) Applicants: Samsung Electronics Co., Ltd., Suwon-si (KR); KOREA UNIVERSITY RESEARCH AND BUSINESS FOUNDATION, Seoul (KR)

(72) Inventors: Yongok Kim, Suwon-si (KR); Inkyu Lee, Seoul (KR); Jeehwan Noh, Suwon-si (KR); Myungkwang Byun, Suwon-si (KR); Subin Eom, Seoul (KR); Hongju Lee, Seoul (KR)

(73) Assignees: Samsung Electronics Co., Ltd., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 752 days.

(21) Appl. No.: 17/924,241

(22) PCT Filed: May 14, 2021

(86) PCT No.: PCT/KR2021/006105
§ 371 (c)(1),
(2) Date: Nov. 9, 2022

(87) PCT Pub. No.: WO2021/230721
PCT Pub. Date: Nov. 18, 2021

(65) Prior Publication Data
US 2023/0198590 A1     Jun. 22, 2023

(30) Foreign Application Priority Data
May 15, 2020     (KR) ........................ 10-2020-0058693

(51) Int. Cl.
H04B 7/06          (2006.01)
H04B 7/0417        (2017.01)
(Continued)

(52) U.S. Cl.
CPC ...... H04B 7/0617 (2013.01); H04W 56/0015 (2013.01)

(58) Field of Classification Search
None
See application file for complete search history.

(56) References Cited

U.S. PATENT DOCUMENTS 11,271,699 B1 *  3/2022  Eyuboglu ............. H04L 1/1819
11,375,527 B1 *  6/2022  Eyuboglu .......... H04B 7/15528
(Continued)

FOREIGN PATENT DOCUMENTS

JP         05-075518 A      3/1993
KR   10-2010-0050336 A      5/2010
(Continued)

OTHER PUBLICATIONS

Korean Office Action dated Mar. 13, 2023, issued in a Korean Application No. 10-2020-0058693.

*Primary Examiner* — Mansour Oveissi
*Assistant Examiner* — Ning Li
(74) *Attorney, Agent, or Firm* — Jefferson IP Law, LLP

(57)          ABSTRACT
The present disclosure relates to a 5th-generation (5G) or pre-5G communication system, which is to be provided for supporting higher data transmission rates after a 4th-generation (4G) communication system, such as long-term evolution (LTE). A method of a base station proposed in various embodiments of the present disclosure comprises the procedures of: transmitting synchronization signal blocks (SSBs) allocated on the basis of deployment information of the base station, an angle covered by each sector of the base
(Continued)

station, and the number of SSB indices; receiving, from a terminal, an SSB index selected from among the SSBs; estimating a location of the terminal on the basis of the SSB index; estimating a speed of the terminal on the basis of the SSB index and the location of the terminal; estimating a moving section of the terminal on the basis of the speed of the terminal; and configuring a beamforming vector for the terminal on the basis of the moving section of the terminal.

11 Claims, 17 Drawing Sheets

(51) Int. Cl.
H04J 11/00 (2006.01)
H04W 56/00 (2009.01)

(56) References Cited

U.S. PATENT DOCUMENTS

| | | | |
|---|---|---|---|
| 2010/0113019 A1 | 5/2010 | Jeong et al. | |
| 2012/0106595 A1* | 5/2012 | Bhattad | H04B 7/0617 |
| | | | 375/296 |
| 2012/0178468 A1 | 7/2012 | Jeong et al. | |
| 2015/0365939 A1 | 12/2015 | Zhang et al. | |
| 2016/0308593 A1* | 10/2016 | Zhu | H04B 7/0469 |

| | | | |
|---|---|---|---|
| 2017/0006539 A1 | 1/2017 | Kakishima et al. | |
| 2017/0006629 A1* | 1/2017 | Jung | H04W 72/046 |
| 2017/0034733 A1 | 2/2017 | Sun et al. | |
| 2017/0195893 A1 | 7/2017 | Lee et al. | |
| 2018/0294934 A1 | 10/2018 | Kim et al. | |
| 2019/0166453 A1 | 5/2019 | Edge et al. | |
| 2019/0380015 A1* | 12/2019 | El Assaad | H04B 7/0617 |
| 2020/0096608 A1* | 3/2020 | Bialer | G01S 13/42 |
| 2020/0150684 A1 | 5/2020 | Kim | |
| 2020/0305052 A1* | 9/2020 | Yoshino | H04W 36/00835 |
| 2020/0328861 A1* | 10/2020 | Malladi | H04L 5/0069 |
| 2020/0389831 A1* | 12/2020 | Mackenzie | H04W 36/324 |
| 2020/0393540 A1* | 12/2020 | Bialer | G01S 7/4026 |
| 2021/0006372 A1 | 1/2021 | Cha et al. | |
| 2021/0076417 A1* | 3/2021 | Bayesteh | H04W 76/27 |
| 2021/0099224 A1 | 4/2021 | Yeo et al. | |
| 2021/0258940 A1* | 8/2021 | Kim | H04W 72/046 |
| 2022/0140969 A1* | 5/2022 | Cha | G01S 5/011 |
| | | | 455/452.1 |

FOREIGN PATENT DOCUMENTS

| | | | |
|---|---|---|---|
| KR | 10-2012-0080324 A | 7/2012 | |
| KR | 10-2016-0081742 A | 7/2016 | |
| KR | 10-2017-0020343 A | 2/2017 | |
| KR | 10-2017-0040770 A | 4/2017 | |
| KR | 10-2019-0075485 A | 7/2019 | |
| KR | 10-2019-0126025 A | 11/2019 | |
| KR | 10-2020-0050901 A | 5/2020 | |

* cited by examiner

[Beam in space]

[Beam in time]

SS Burst set period

Time

Use short period

Use wide beam $2d_0 \tan(60°)/64$ $2d_0 \tan(60°)$

| Parameter | Setting |
|---|---|
| Distance between BS and road $d_1$ | 5 m |
| Height of BS $d_2$ | 10 m |
| SSB index m | 1,...,64 |
| UE speed $v$ | 50 m/s (180 km/h) |
| SSB periodicity T | 40 ms |
| Distance between BS and road $N_t$ (ULA) | 32 |
| Number of samplings in angular section$_{res}$ | 40 |

FIG. 12

DEVICE AND METHOD FOR BEAM MANAGEMENT IN COMMUNICATION SYSTEM

CROSS-REFERENCE TO RELATED APPLICATION(S)

This application is a U.S. National Stage application under 35 U.S.C. § 371 of an International application number PCT/KR2021/006105, filed on May 14, 2021, which is based on and claimed priority of a Korean patent application number 10-2020-0058693, filed on May 15, 2020, in the Korean Intellectual Property Office, the disclosure of which is incorporated by reference herein in its entirety.

TECHNICAL FIELD

The present disclosure generally relates to a device and method for beam management in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in higher frequency bands, for example, ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (hereinafter referred to as "massive MIMO"), full dimensional MIMO (hereinafter referred to as "FD-MIMO"), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, there is a need for schemes to efficiently employing beams in wireless communication systems.

DETAILED DESCRIPTION OF THE INVENTION

Technical Problem

One aspect of the present disclosure is to provide a device and method for beam management in a communication system.

Another aspect of the present disclosure is to provide a device and method for allocating a beam to a mobile terminal in a communication system.

Another aspect of the present disclosure is to provide a device and method for allocating a beam to a terminal, based on a moving section of the terminal in a communication system.

Another aspect of the present disclosure is to provide a device and method for allocating a beam to a terminal, based on a moving section and a beam width of the terminal in a communication system.

Technical Solution

In accordance with an embodiment of the present disclosure, a method of a terminal is provided, and the method may include transmitting synchronization signal blocks (SSBs) allocated based on deployment information of the base station, an angle covered by each sector of the base station, and the number of SSB indices, receiving, from a terminal, an SSB index of an SSB selected from among the SSBs, estimating a location of the terminal, based on the SSB index, estimating a speed of the terminal, based on the SSB index and the location of the terminal, estimating a moving section of the terminal, based on the speed of the terminal, and configuring a beamforming vector for the terminal, based on the moving section of the terminal.

In accordance with another embodiment of the present disclosure, a base station is provided, and the base station may include a transceiver configured to transmit synchronization signal blocks (SSBs) allocated based on deployment information of the base station, an angle covered by each sector of the base station, and the number of SSB indices, and receiving, from a terminal, an SSB index of an SSB selected from among the SSBs, and a controller configured to estimate a location of the terminal, based on the SSB index, estimate a speed of the terminal, based on the SSB index and a location of the terminal, estimate a moving section of the terminal, based on the speed of the terminal, and configure a beamforming vector for the terminal, based on the moving section of the terminal.

In accordance with another embodiment of the present disclosure, a method of a terminal is provided, and the method may include receiving synchronization signal blocks (SSBs) from a base station, selecting an SSB among the SSBs and transmitting, to the base station, an SSB index of the selected SSB, and receiving a signal transmitted from the base station, based on a beamforming vector determined correspond to the selected SSB, wherein the beamforming vector is configured based on a moving section of the terminal, the moving section being estimated based on a speed of the terminal, the speed being estimated based on the SSB index and a location of the terminal, and wherein the location of the terminal is estimated based on the SSB index.

In accordance with another embodiment of the present disclosure, a terminal is provided, and the terminal may include a transceiver configured to receiving synchronization signal blocks (SSBs) from a base station, transmit an SSB index of an SSB selected from among the SSBs, and receive a signal transmitted from the base station, based on a beamforming vector determined corresponding to the selected SSB, and a controller configured to select a specific SSB among the SSBs, wherein the beamforming vector is configured based on a moving section of the terminal estimated based on a speed of the terminal, the speed being estimated based on the SSB index and a location of the terminal, and wherein the location of the terminal is estimated based on the SSB index.

Advantageous Effects

The present disclosure has the advantage of making it possible to efficiently operate a beam in a communication system.

In addition, the present disclosure has the advantage of making it possible to allocate a beam to a mobile terminal in a communication system.

Another aspect of the present disclosure has an advantage in that it is possible to allocate a beam to a terminal, based on a moving section of the terminal in a communication system.

Another aspect of the present disclosure has an advantage in that it is possible to allocate a beam to a terminal, based on a moving section and a beam width of the terminal in a communication system.

BRIEF DESCRIPTION OF DRAWINGS

FIG. 12 is a diagram illustrating parameters used in simulation for performance verification of a beam operation method according to various embodiments of the present disclosure.

MODE FOR CARRYING OUT THE INVENTION

Figure 1A:
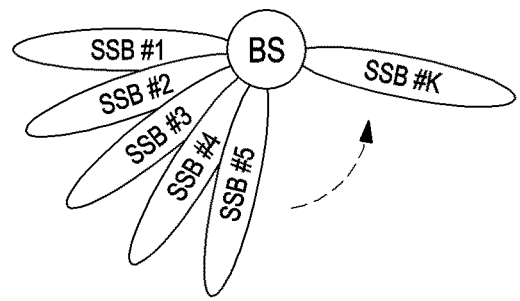
FIG. 1A is a diagram illustrating a beam sweeping process in a communication system according to various embodiments of the present disclosure.
Figure 1A:
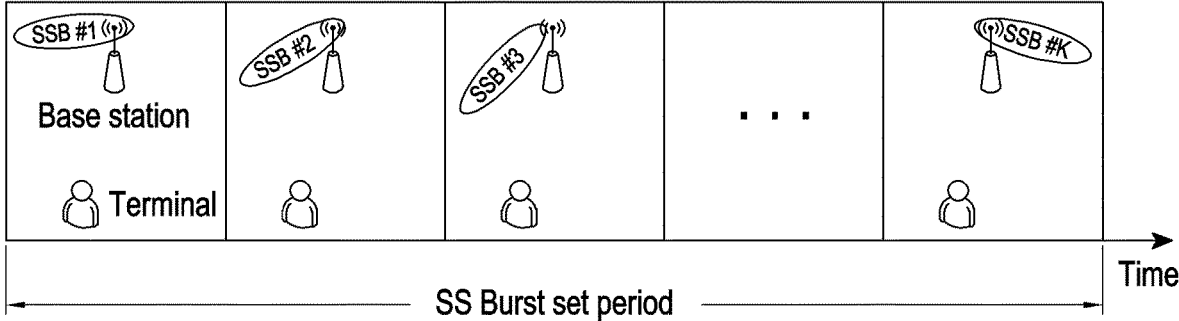

Hereinafter, various embodiments of the disclosure will be described with reference to the accompanying drawings. It should be appreciated that they are not intended to limit the technological features set forth herein to particular embodiments and include various modifications, equivalents, and/or alternatives for the embodiments of the disclosure. With regard to the description of the drawings, similar reference signs may be used to designate similar or relevant elements.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", " " at least one of A and B", or "at least one of A or B" may refer to all of (1) including at least one A, (2) including at least one B, or (3) including all of at least one A and at least one B.

The expressions "a first", "a second", "the first", "the second", and the like as used herein may modify various elements regardless of the order and/or the importance thereof, and are used merely to distinguish between one element and any other element and do not limit the corresponding elements. As an example, a first user device and a second user device may represent different user devices regardless of the order or importance thereof. For example, a first element may be termed a second element, and similarly, a second element may be termed a first element without departing from the protection scope of the disclosure.

It should be understood that when an element (e.g., a first element) is referred to as being (operatively or communicatively) "coupled" or "connected" with/to another element (e.g., a second element), it may be directly connected or coupled directly with/to the other element or any other element (e.g., a third element) may be interposer between them. In contrast, it may be understood that when an element (e.g., a first element) is referred to as being "directly connected" or "directly coupled" with/to another element (e.g., a second element), there are no element (e.g., a third element) interposed between them.

The expression "configured to" as used herein may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a general-purpose processor (e.g., a central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Before describing various embodiments of the present disclosure, a transmission device as used herein may be one of a base station (BS), a node B, an evolved node B (eNB), a next generation node B (gNB), and the like.

In addition, a transmission device as used herein may be one of a terminal, a user equipment (UE), a mobile station (MS), and the like. The transmission device may also be an electronic device, and the electronic device may be one of various types of electronic devices. The electronic device according to various embodiments may include, for example, a computer device, a portable communication device (e.g., a smart phone), a portable multimedia device, a portable medical device, a camera, a wearable device, or a home appliance. The electronic device according to embodiments of the disclosure is not limited to those described above.

Before describing various embodiments of the present disclosure, a reception device as used herein may be one of a base station (BS), a node B, an evolved node B (eNB), a next generation node B (gNB), and the like.

In addition, a reception device as used herein may be one of a terminal, a user equipment (UE), a mobile station (MS), and the like. The reception device may also be an electronic device, and the electronic device may be one of various types of electronic devices. The electronic device according to various embodiments may include, for example, a computer device, a portable communication device (e.g., a smart phone), a portable multimedia device, a portable medical device, a camera, a wearable device, or a home appliance. The electronic device according to embodiments of the disclosure is not limited to those described above.

First, the beam operation process may include four processes as follows.

1. Beam sweeping process: It is a process in which a base station allocates a transmission beam covering a specific spatial area to a terminal at a set period. Here, other synchronization signal block (SSB, hereinafter referred to as "SSB") indexes are mapped to the transmission beams, and the transmission beams cover other specific spatial regions and transmit a reference signal to the terminal. An example of this is shown in FIG. 1A.

Figure 1B:
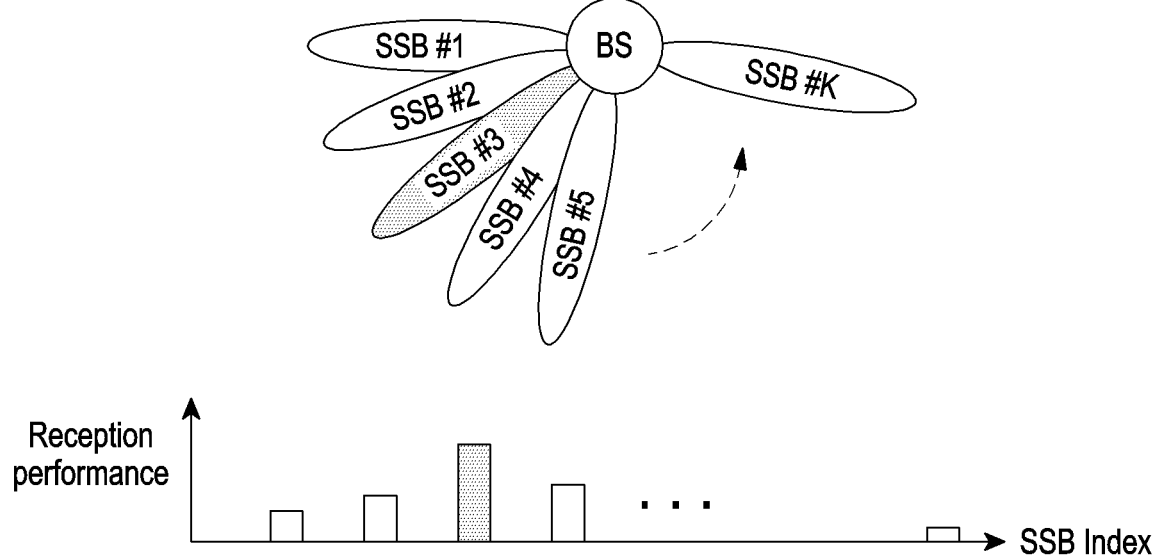
FIG. 1B is a diagram illustrating a beam measurement process in a communication system according to various embodiments of the present disclosure.

2. Beam measurement process: It is a process in which the terminal measures the reception performance for each SSB index, based on the strength of a reference signal received through each SSB. An example of this is shown in FIG. 1B. In FIG. 1B, the reception performance of SSB index 3 (SSB #3) is the maximum.

3. Beam reporting process: It is a process in which the terminal reports the SSB index of the SSB indicating the maximum performance among the SSBs to the base station, based on the beam measurement result to the base station.

4. Beam determination process: It is a process in which the base station determines, as a beam for the terminal, a beam corresponding to the received SSB index as a beam to be used for signal transmission/reception with the terminal, based on the SSB index received from the terminal and allocates the determined beam to the terminal.

Figure 1C:
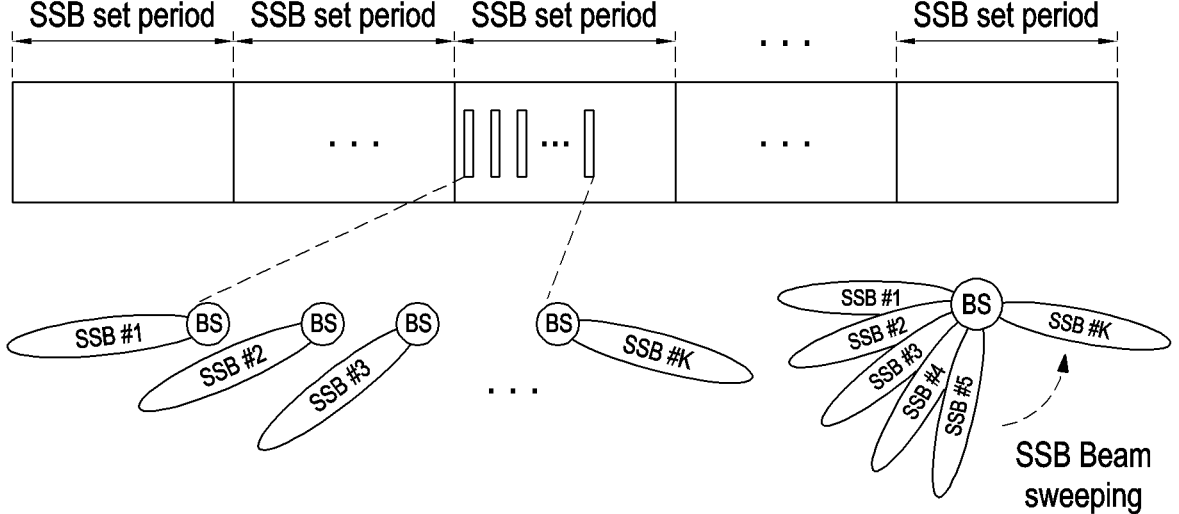
FIG. 1C is a diagram illustrating an overall process of a beam update in a communication system according to various embodiments of the present disclosure.
Figure 2A:
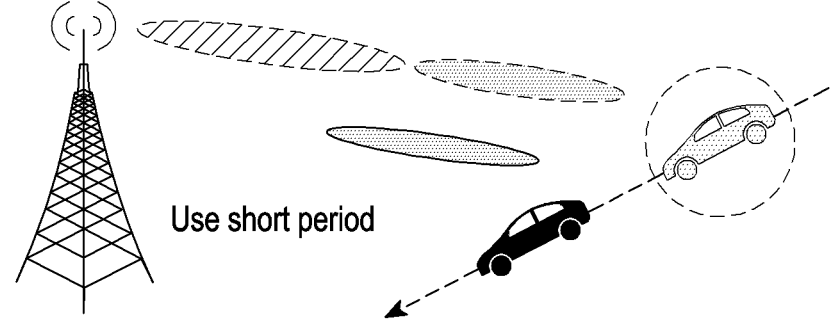
FIG. 2A is a diagram illustrating an example of a method of solving a beam mismatch issue in a communication system according to various embodiments of the present disclosure.
Figure 2B:
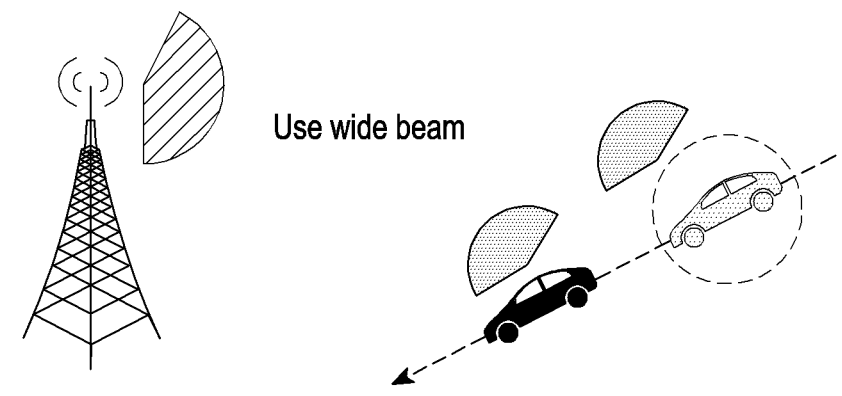
FIG. 2B is a diagram illustrating another example of a method of solving a beam mismatch issue in a communication system according to various embodiments of the present disclosure.

Meanwhile, the base station periodically performs a beam update process according to a set SSB update period value. An example of this is shown in FIG. 1C.

Meanwhile, in the case of a 5G system, which is a next-generation wireless communication system, it is intended to obtain increased communication performance with a large bandwidth by using a millimeter wave (mm-Wave, hereinafter referred to as "mmWave") (e.g., 60 Ghz) band. However, in general, in the case of a high frequency band, a large path loss occurs compared to a low frequency band due to its characteristics, so that a beamforming technique is used to overcome the path loss. In general, it is intended to offset through the beamforming gain. Since the beamforming gain increases as the beam becomes sharper, the base station mainly forms a narrow beam in the mmWave band to support the service for the terminal.

A beam allocation scheme in which a narrow beam is formed is used in a current communication system, and in the case of a narrow beam, a large beamforming gain can be obtained when the terminal is fixed, or the terminal has little mobility.

In the current communication system, immediately after beam determination is made by the beam management operation, the base station adjusts the beam angle appropriately and allocates the beam to the terminal, so that high reception performance can be maintained.

However, when the narrow beam method is used in an environment in which the terminal is highly mobile, a beam mismatch phenomenon occurs between the base station and the terminal according to the movement of the terminal. When a beam mismatch occurs, reception performance is greatly reduced according to mmWave characteristics with strong linearity, and it is difficult to stably support a terminal moving at a high speed.

Such a beam mismatch phenomenon could be solved in two ways in the prior art. The first is a method in which the base station performs beam operation at high frequency by setting the SSB update period value to be small. The first method can reduce the effect of the beam mismatch phenomenon, but has a disadvantage in that it is not efficient in terms of resource management of the base station. The second is simply a method of performing beam operation using a wide beam in order to reduce beam mismatch between the base station and the terminal. In the case of the second method, when a wide beam allocation method is used in an environment with high terminal mobility, beam mismatch phenomenon can be minimized by covering the terminal mobility, but there is a limit in practical application in the mmWave communication system because the method suffers a severe loss in the antenna array gain.

In various embodiments of the present disclosure, various assumptions may be considered in order to allocate a beam suitable for a terminal, which will be described in detail below. In particular, in various embodiments of the present disclosure, various assumptions may be considered in order to efficiently allocate a beam suitable for a terminal having relatively high mobility.

Figure 3:
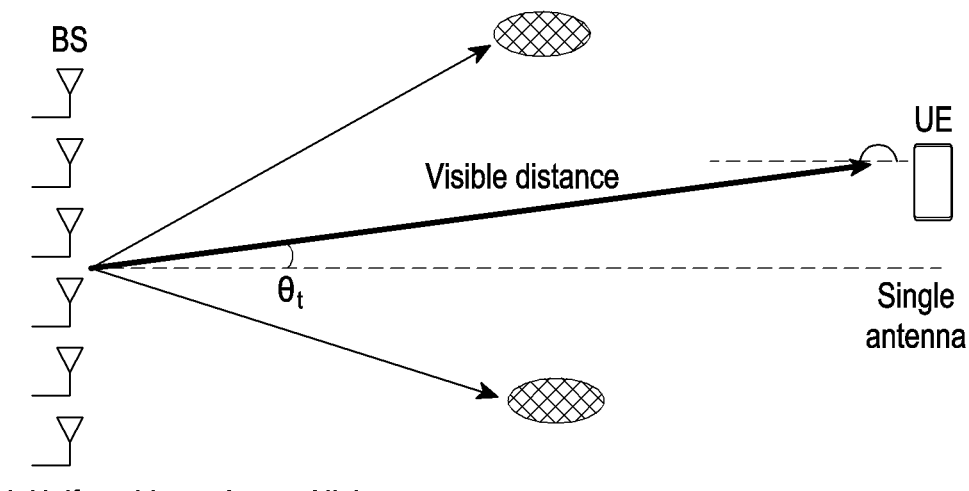
FIG. 3 is a diagram for describing an mmWave channel model used in a communication system according to various embodiments of the present disclosure.

FIG. 3 is a diagram for describing an mmWave channel model used in a communication system according to various embodiments of the present disclosure.

Referring to FIG. 3, in various embodiments of the present disclosure, it is assumed that one base station supports a mobile terminal in an mmWave system. In a communication system, based on the mmWave band, because path loss appears relatively large in free space, and the line of sight (hereinafter referred to as "LoS") path between the base station and the terminal is dominantly affected in communication, a single-path geometric channel model considering only the LoS path was assumed, as shown in FIG. 3. Here, the channel model function for the single-path geometric channel model may be expressed as Equation 1 below.

$$h = \sqrt{N_t}\sqrt{\alpha}\overline{\alpha}^H(\theta) \qquad \text{Equation 1}$$

In Equation 1, h denotes a channel function, $N_t$ denotes the number of transmit antenna elements of a transmitting apparatus, for example, a base station, $\theta$ denotes an angle of departure (hereinafter referred to as 'AoD'), and $\alpha$ denotes a weight variable generated based on the antenna gain and the path-loss based on the distance between the base station and the terminal. In Equation 1, H denotes a Hermitian operation.

In addition, in Equation 1, $\overline{\alpha}(\theta)$ is an array response vector, when considering a uniform linear array (ULA, hereinafter referred to as "ULA") including $N_t$ transmit antenna elements, $\overline{\alpha}(\theta)$ may be expressed as Equation 2 below.

$$\overline{a}(\theta) = \frac{1}{\sqrt{N_t}}\left[1\, e^{j\pi sin\theta} \cdots e^{j\pi(N_t-1)sin\theta}\right]^T \qquad \text{Equation 2}$$

Meanwhile, in various embodiments of the present disclosure, a path loss according to a distance is estimated based on, for example, a UMI-Street Canyon model, and the path loss may be expressed as Equation 3 below.

$$PL(\theta) = 32.4 + 21\,\log_{10}(d(\theta)) + 20\,\log_{10}(f_c)(dB), f_c = 28\,(GHz) \qquad \text{Equation 3}$$

In Equation 3, $\theta$ denotes AoD, and $d(\theta)$ denotes the distance between the base station and the terminal according to $\theta$.

An antenna gain related to the generation of the weight variable $\alpha$ may be expressed as in Equation 4 below in consideration of a three-sector model using a directional antenna.

$$A_E(\theta) = 8 - \min\left(12\left(\frac{\theta}{65°}\right)^2, 30\right)(dB) \qquad \text{Equation 4}$$

In Equation 4, $\theta$ means AoD.

Figure 4:
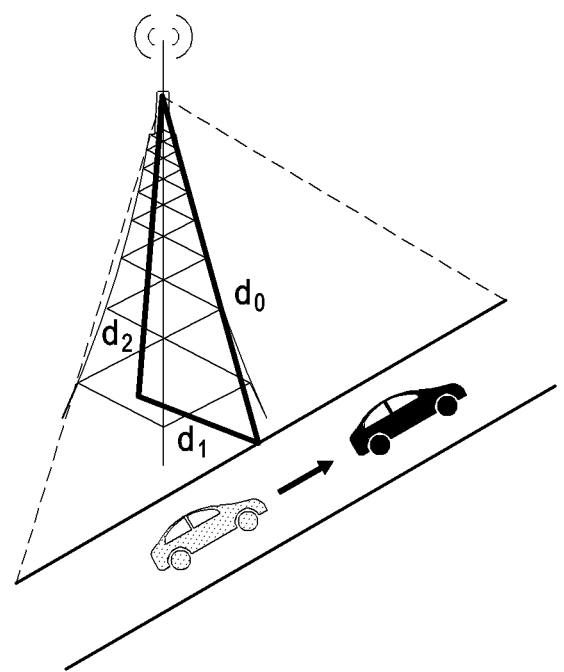
FIG. 4 is a diagram schematically illustrating an deployment of a road and a base station assumed in a method of allocating synchronization signal blocks (SSBs) in a communication system according to various embodiments of the present disclosure.

FIG. 4 is a diagram schematically illustrating an deployment of a road and a base station assumed in a method of allocating synchronization signal blocks (SSBs) in a communication system according to various embodiments of the present disclosure. In various embodiments of the present disclosure, it is assumed that the terminal moves on a fixed straight path such as a road and a railroad. In FIG. 4, it is assumed that the terminal moves on a road for convenience, and the width of the road is not considered.

Referring to FIG. 4, it is assumed that the base station is installed to cover road conditions. It is assumed that the ground on which the base station is installed is horizontally separated by $d_1$ from the road. Accordingly, the shortest distance between the base station and the road may be expressed as $$d_a = \sqrt{d_1^2 + d_2^2}.$$

When a three-sector model is assumed, it is assumed that the base station covers only one sector out of three sectors. It is assumed that a sector considered in various embodiments of the present disclosure is 120 degrees, that is, a section of −60 to 60 degrees. The base station reports the SSB index with the highest reception performance from the terminal through a beam sweeping process every SSB update period T for smooth communication with the terminal. Here, the SSB update period T may be, for example, T=40 msec. At this time, since the band to be considered is the mmWave band, the SSB index and the corresponding SSB can be configured in a plurality, for example, 64. Here, it is assumed that the base station receives the SSB index from the terminal for each update period.

Next, various examples of a scheme in which the base station allocates an SSB will be described with reference to FIGS. 5A and 5B.

Figure 5A:
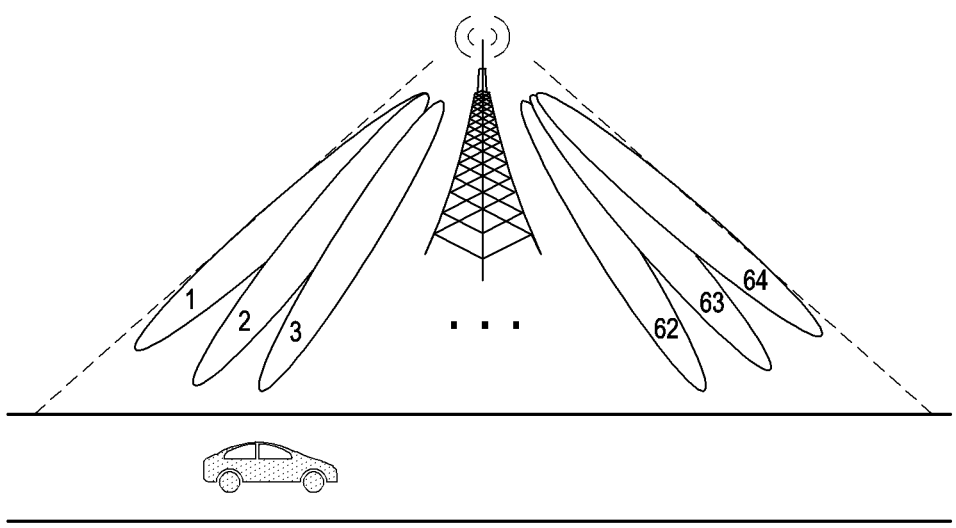
FIG. 5A is a diagram schematically illustrating an example of a method of allocating an SSB in a communication system according to various embodiments of the present disclosure.

FIG. 5A is a diagram schematically illustrating an example of a method of allocating an SSB in a communication system according to various embodiments of the present disclosure.

Referring to FIG. 5A, a first method is to equally divide and cover the −60 to 60 degree section covered by the base station (uniform angle method). The uniform angle method is a method in which a section of −60 to 60 degrees, which is a section considered for SSB allocation, is equally divided into a set number of SSB indexes, for example 64, to cover a unit angle section of 1.875 degrees for each SSB. When the indices for the divided SSBs are expressed as 1 to 64, and the divided angle between the SSB indices is expressed as $\theta_0$, the angle to which the SSB index m is assigned based on the shortest line connecting each base station and the road may be expressed by Equation 5 below.

$$\theta_b(m) = -60 + \phi_0\left(m - \frac{1}{2}\right) \qquad \text{Equation 5}$$

Here, $\theta_b(m)$ means an angle to which the SSB index m is assigned.

Figure 5B:
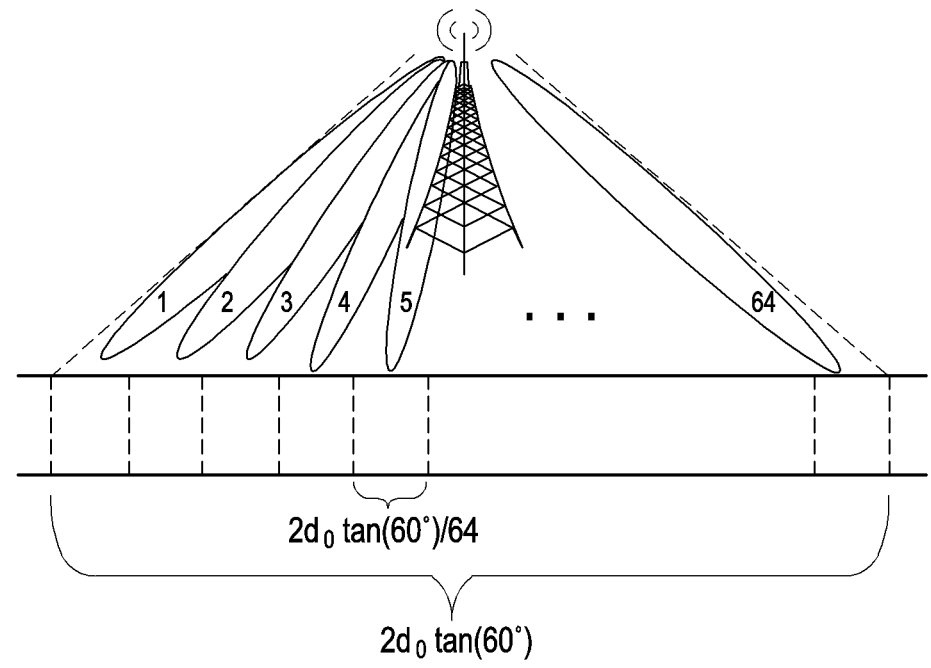
FIG. 5B is a diagram schematically illustrating another example of a method of allocating an SSB in a communication system according to various embodiments of the present disclosure.

Referring to FIG. 5B, a second method is to divide and cover the road sections covered by the base station equally (Uniform road method). The uniform road method is a method in which when the −60 to 60 degree section, which is the section considered for SSB allocation, is projected onto the road, the total range of roads to be covered is equally divided and each SSB covers the road. Here, the length of the projected road section is $2d_0 \tan(60°)$, and the section to be covered by each SSB is $2d_0 \tan(60°)/64$ divided by the total number of SSBs. When a section to be covered by each SSB, that is, a unit section is expressed by $\gamma_0$, the angle to which each SSB index m is allocated may be expressed by Equation 6 below.

$$\theta_b(m) = \arctan\left(\left(-d_0\tan(60°) + \gamma_0\left(m - \frac{1}{2}\right)\right)/d_0\right) \qquad \text{Equation 6}$$

Here, $\theta_b(m)$ means an angle to which the SSB index m is assigned.

Figure 6:
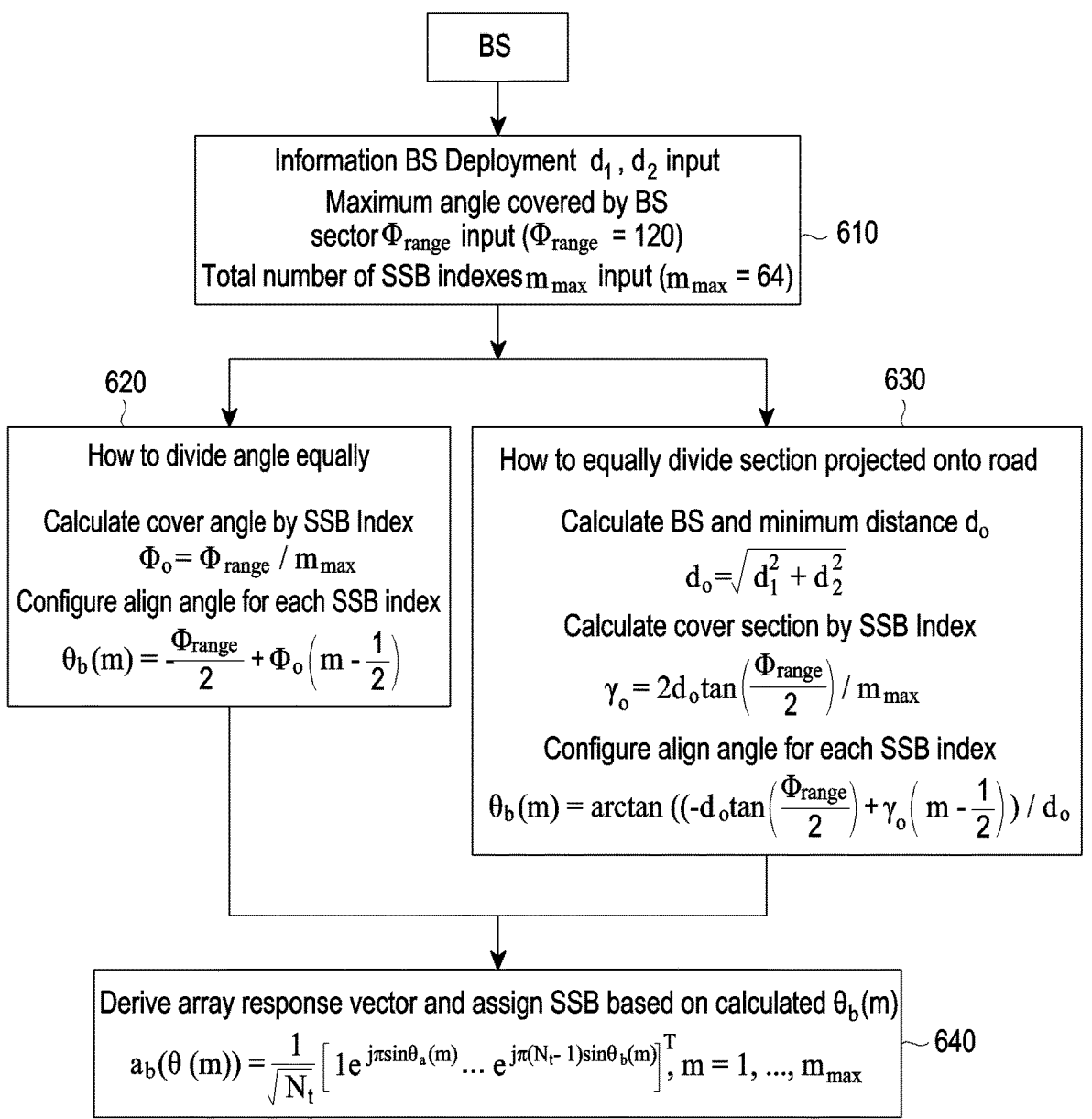
FIG. 6 is a flowchart schematically illustrating an operation in which a base station allocates an SSB in a communication system according to various embodiments of the present disclosure.

FIG. 6 is a flowchart schematically illustrating an operation in which a base station allocates an SSB in a wireless communication system according to various embodiments of the present disclosure.

Referring to FIG. 6, the base station inputs $d_1$, $d_2$, base station deployment information, an angle $\phi_{range}$ covered by a base station sector, for example, 120 degrees, and a total number of SSB indexes $m_{max}$, for example 64 (610). When the base station allocates the SSB in the uniform angle method, the angle assigned to each SSB index m may be expressed as $$\theta_b(m) = -\frac{\phi_{range}}{2} + \phi_0\left(m - \frac{1}{2}\right)$$

as shown in FIG. 5A (620). When the base station allocates the SSB in the uniform road method, the angle allocated to the SSB index m may be expressed as $$\theta_b(m) = \arctan\left(\frac{-d_0\tan\left(\frac{\phi_{range}}{2}\right) + \gamma_0\left(m - \frac{1}{2}\right)}{d_0}\right)$$

as shown in FIG. 5B (630). The base station derives an array response vector, based on the calculated $\theta_b(m)$ and allocates the SSB according to the array response vector (640). The array response vector is expressed as Equation 2 above.

A beam sweeping process is performed based on the SSB obtained through the above methods. In this case, the SSB index with the highest reception performance is reported from the terminal in the nth SSB update period, and this is referred to as $I_n$.

Figure 7A:
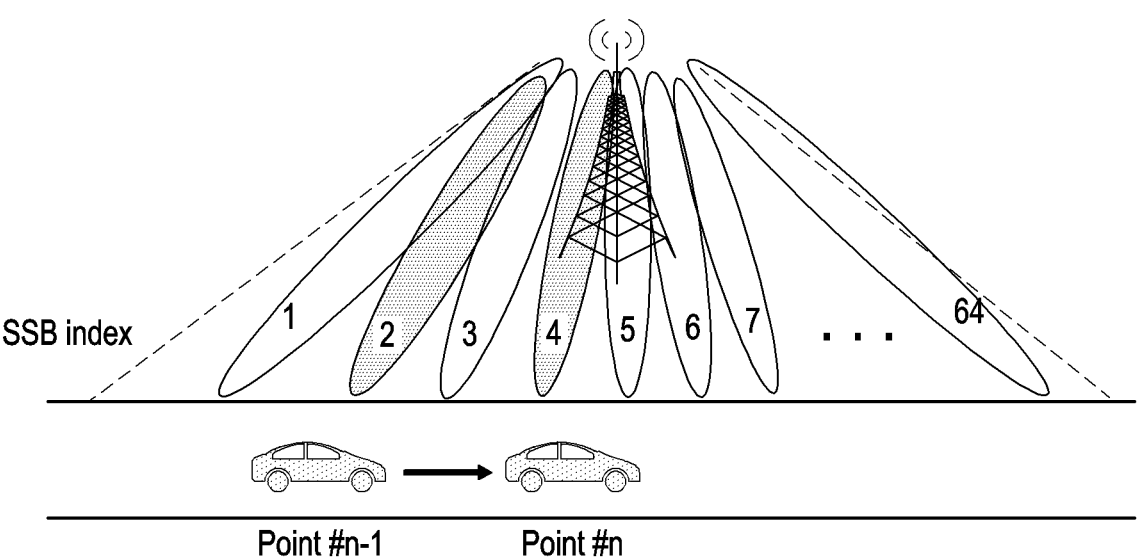
FIG. 7A is a diagram illustrating an example of a method of estimating a speed of a terminal in a communication system according to various embodiments of the present disclosure.

FIG. 7A is a diagram illustrating an example of a method of estimating a speed of a terminal in a communication system according to various embodiments of the present disclosure.

Referring to FIG. 7A, first, when it is assumed that the terminal is located at the center of the angle range, the angle at which the terminal is located can be obtained as follows.

If the angle range covered by the SSB corresponding to the SSB index $I_n$ is expressed as $\phi_s(I_n) \sim \phi_c(I_n)$, the angle at which the terminal is located can be expressed as c $\theta_{UE}(I_n) = (\phi_s(I_n) + \phi_e(I_n))/2$ Assuming that the terminal is located at the center of the section projected onto the road, the angle at which the terminal is located can be obtained as follows.

If the road range covered by the SSB corresponding to the SSB index $I_n$ is expressed as $\gamma_s(I_n) \sim \gamma_e(I_n)$, the location of the terminal on the road can be expressed as $(\gamma_s(I_n) \sim \gamma_e(I_n))/2$, and in this case, the angle at which the terminal is located can be expressed as $\theta_{UE}(I_n) = \arctan((\gamma_s(I_n) \sim \gamma_e(I_n))/(2d_0))$.

Based on the angle of the terminal obtained according to each of the above methods, the position of the terminal on the road may be expressed by Equation 7 below.

$$\lambda_{UE}(I_n) = d_0 \tan(\theta_{UE}(I_n)) \qquad \text{Equation 7}$$

Since the location of the terminal can be estimated based on the SSB index reported from the terminal, it is possible to estimate the speed of the terminal, based on the SSB update period T and the change in the SSB index of the terminal. At this time, by assuming that the speed of the terminal is the same within one SSB update period or the entire section in which the terminal moves, it is possible to estimate the speed of the terminal as follows.

The first method is to estimate the speed of the terminal under the assumption that the speed of the terminal is the same within one SSB update period.

In the first method, it is assumed that the speed of the terminal is the same in the $(n-1)^{th}$ SSB update period and the $n^{th}$ SSB update period. The speed of the terminal can be estimated based on the difference between the location of the terminal estimated based on the SSB index $I_{n-1}$ received in the $(n-1)^{th}$ SSB update interval and the location of the terminal estimated based on the SSB index $I_n$ received in the nth SSB update interval. Since the terminal moves from $\lambda_{UE}(I_{n-1}) = d_0 \tan(\theta_{UE}(I_{n-1}))$ to $\lambda_{UE}(I_n) = d_0 \tan(\theta_{UE}(I_n))$ on the road during the SSB update period T, the estimated speed of the terminal can be expressed as Equation 8 below.

$$\tilde{v}(n) = \frac{\lambda_{UE}(I_n) - \lambda_{UE}(I_{n-1})}{T} \qquad \text{Equation 8}$$

The second method is to estimate the speed of the terminal on the assumption that the speed of the terminal is the same in the entire section.

The second method is a method of estimating the speed of the terminal by using the SSB index $I_1, \ldots, I_n$ obtained not only in the $(n-1)^{th}$ SSB update period but also in all previous SSB update periods. The $I_m$ and $I_{m-1}$ (m=2, ..., n)), that is, the speed of the terminal for each SSB update period may be estimated using the first method, based on the difference in the position of the terminal obtained based on the SSB indices obtained in one SSB update period and the immediately next SSB update period, and the average of the speed of the terminal for each SSB update period may be estimated as the average speed of the entire movement period of the terminal.

When the speed is expressed as $$v_1(m) = \frac{\lambda_{UE}(I_m) - \lambda_{UE}(I_{m-1})}{T}, (m = 2, \ldots, n),$$

based on the position $\lambda_{UE}(I_m) = d_0 \tan (\theta_{UE}(I_m))$ of the terminal in the SSB index $I_m$, the estimated speed $\tilde{v}(n)$ of the terminal can be expressed by Equation 9 below.

$$\tilde{v}(n) = \frac{v_1(2) + v_1(3) + \ldots + v_1(n)}{n - 1} \qquad \text{Equation 9}$$

Figure 7B:
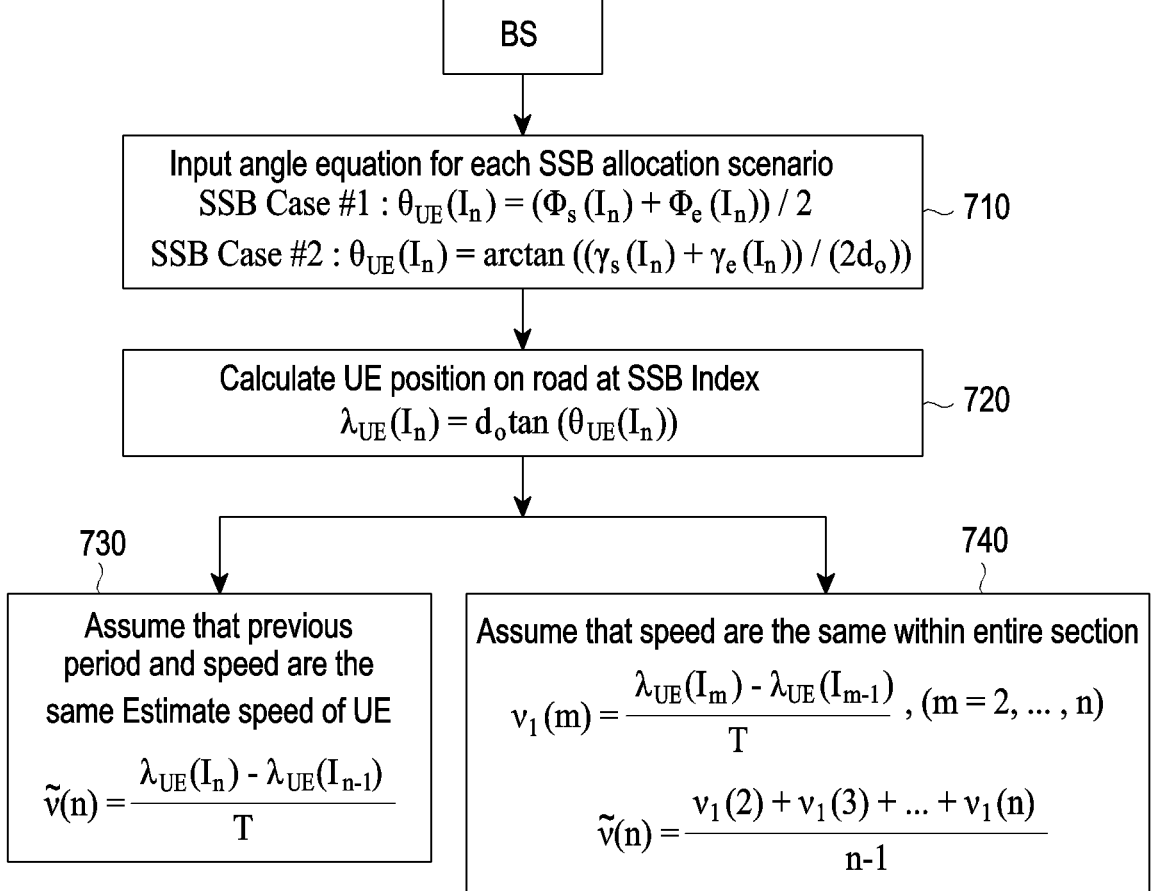
FIG. 7B is a flowchart schematically illustrating an operation in which a base station estimates a speed of a terminal in a communication system according to various embodiments of the present disclosure.

FIG. 7B is a flowchart schematically illustrating an operation in which a base station estimates a speed of a terminal in a communication system according to various embodiments of the present disclosure.

The flowchart shown in FIG. 7B is a flowchart schematically illustrating an operation in which the base station estimates the speed of the terminal when estimating the speed of the terminal as described in FIG. 7A. The base station inputs the angle at which the above-described terminal is located for each SSB allocation scenario (710). The position of the terminal is calculated based on the angle at which the terminal is located (720). The speed of the terminal may be estimated under the assumption that the speed of the $(n-1)^{th}$ SSB is the same as the speed of the update section and the $n^{th}$ section (S730), and the speed of the terminal is estimated under the assumption that the speed of the terminal is the same within the entire moving section of the terminal may be estimated (740).

Figure 8:
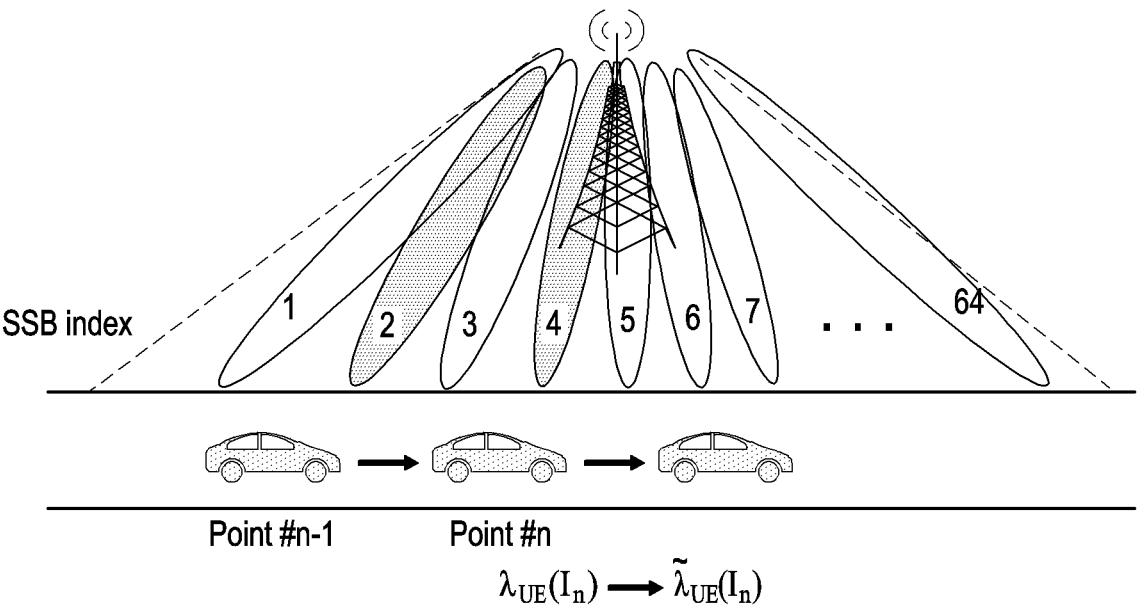
FIG. 8 is a diagram illustrating an example of a method of estimating a moving section of a terminal in a communication system according to various embodiments of the present disclosure.

FIG. 8 illustrates an example of a method of estimating a moving section of a terminal in a communication system according to various embodiments of the present disclosure. In FIG. 8, a method of estimating the moving section of the terminal based on the estimated speed of the terminal is described in detail. It may be estimated) that the terminal moves from $\lambda_{UE}(I_n) = d_0 \tan (\theta_{UE}(I_n))$ to $\tilde{\lambda}_{UE} = d_0 \tan (I_n)) + \tilde{v}$ (n)T=$\lambda_{UE}(I_n) + \tilde{v}(n)T$ during period T, based on the estimated speed $\tilde{v}(n)$ of the terminal. Accordingly, a moving section on the road of the terminal may be expressed as min($\lambda_{UE}(I_n)$, $\tilde{\lambda}_{UE}(I_n)$)~max($\lambda_{UE}(I_n)$,$\tilde{\lambda}_{UE}(I_n)$). Here, the angle for the base station to cover the mobility of the terminal can be expressed by Equation 10 below.

$$\theta_{min} = \min(\theta_{UE}(I_n), \arctan(\lambda_{UE}(I_n)/d_0)), \theta_{max} = \max(\theta_{UE}$$
$$(I_n), \arctan(\lambda_{UE}(I_n)/d_0)) \qquad \text{Equation 10}$$

It has been described above that beam mismatch occurs between the terminal and the base station due to the mobility of the terminal. The base station must form a beam in response to the movement of the terminal and support a seamless service to the terminal. This may be achieved by increasing the minimum reception power experienced in the moving section of the terminal, for example, maximizing the minimum reception power. Therefore, finding an analog beamforming vector w in the base station that increases, for example, maximizing the minimum reception power with respect to the angular range $\theta_{min}$~$\theta_{max}$ for covering the moving section of the terminal is a way to solve the beam mismatch problem between the terminal and the base station.

The problem of obtaining the analog beamforming vector w in the base station that maximizes the minimum reception power for $\theta_{min}$~$\theta_{max}$ may be expressed by Equation 11 below.

$$(P1): \max_{w} \min_{\theta_{min} \leq \theta \leq \theta_{max}} |h(\theta)w|^2 \text{ s.t. } |w(k)| = \frac{1}{\sqrt{N_t}}, k = 1, \ldots N_t \qquad \text{Equation 11}$$

In Equation 11, the reception power of the signal received by the terminal from the base station may be expressed as an absolute value obtained by multiplying the channel function h by the beamforming vector w. It is assumed that the power value of the beamforming vector w having $N_t$ transmit antenna elements is normalized to 1. Accordingly, the magnitude value of the beamforming vector (w(k)) for each antenna may be expressed as $$\frac{1}{\sqrt{N_t}}.$$

Directly calculating and solving the problem P1 in Equation 11 at every SSB index update period T has high complexity, so the calculation proceeds by transforming the problem P1 into a simpler problem. When the angle to cover the moving section of the terminal with respect to the considered angle range $\theta_{min}$~$\theta_{max}$ is expressed as G=$\theta_{max}$-$\theta_{min}$, the P1 problem may be formed as in Equation 12 below by excluding path loss and antenna gain from channel h, that is, assuming that it is α=1, and considering only the array response vector in section $$-\frac{G}{2} \sim \frac{G}{2}.$$

$$(P2)$$

$$\max_{w} \min_{-\frac{G}{2} \leq \theta \leq \frac{G}{2}} |a(\theta)^H w|^2 \qquad \text{Equation 12}$$

$$\text{s.t.}$$

-continued $$|w(k)| = \frac{1}{\sqrt{N_t}},$$

$$k = 1, \ldots, N_t$$

Instead of directly solving P1 in Equation 11, an analog beamforming vector w obtained by solving problem P2 in Equation 12 may be phase shifted to an angular range $\theta_{min} \sim \theta_{max}$ to be utilized as a beam supporting a terminal.

Figure 9:
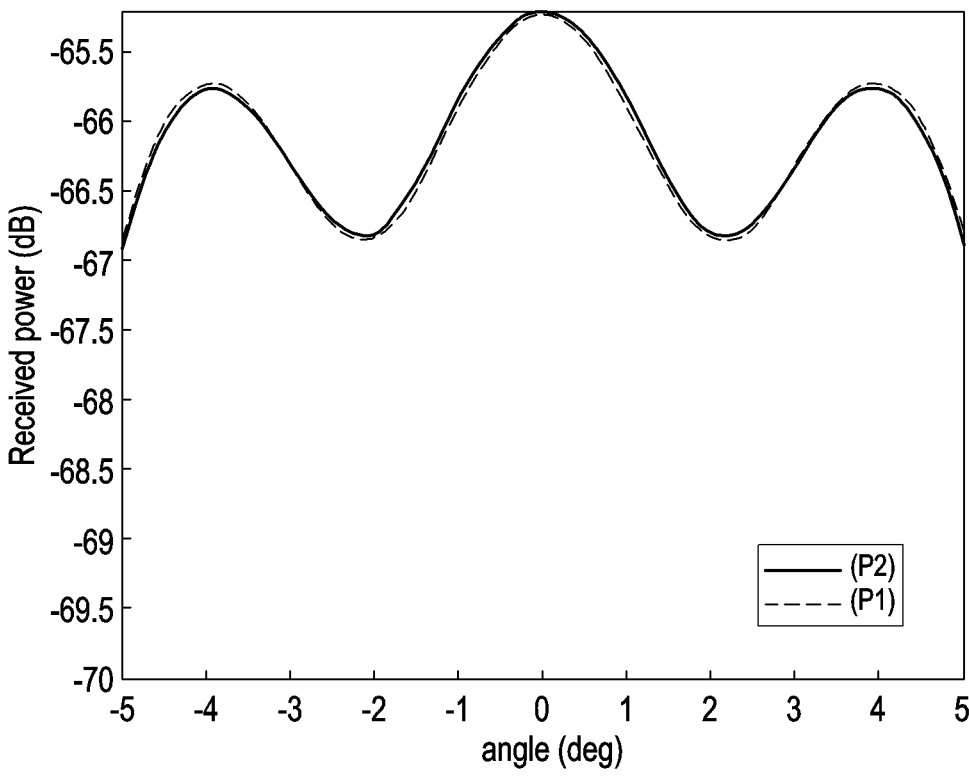
FIG. 9 is a diagram schematically illustrating a relationship between a beamforming vector forming method and received power in a communication system according to various embodiments of the present disclosure.
Figure 9:
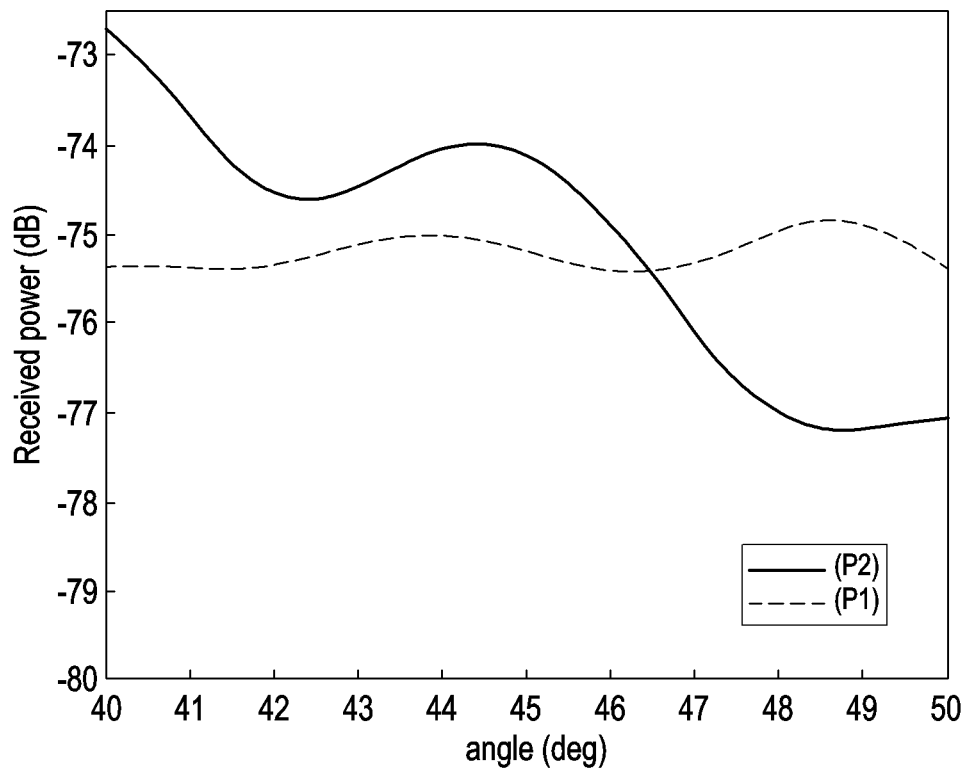

FIG. 9 is a diagram schematically illustrating a relationship between a beamforming vector forming method and received power in a communication system according to various embodiments of the present disclosure.

FIG. 9 shows a comparison table of the received power obtained by directly solving the problem of maximizing the minimum received power by P1 and by changing it to P2. Referring to FIG. 9, the P1 and P2 methods show similar performance as the center value of $\theta_{min} \sim \theta_{max}$ approaches 0 degrees (e.g., −5 to 5 degrees), show that distortion occurs in the P2 method as it gets closer to the side (e.g., 40 to 50 degrees), but show good performance with a difference of about 2 to 3 dB. Therefore, in the present disclosure, the analysis of P2 is mainly performed.

In the present disclosure, two methods are proposed as a method of solving the problem P2.

Figure 10:
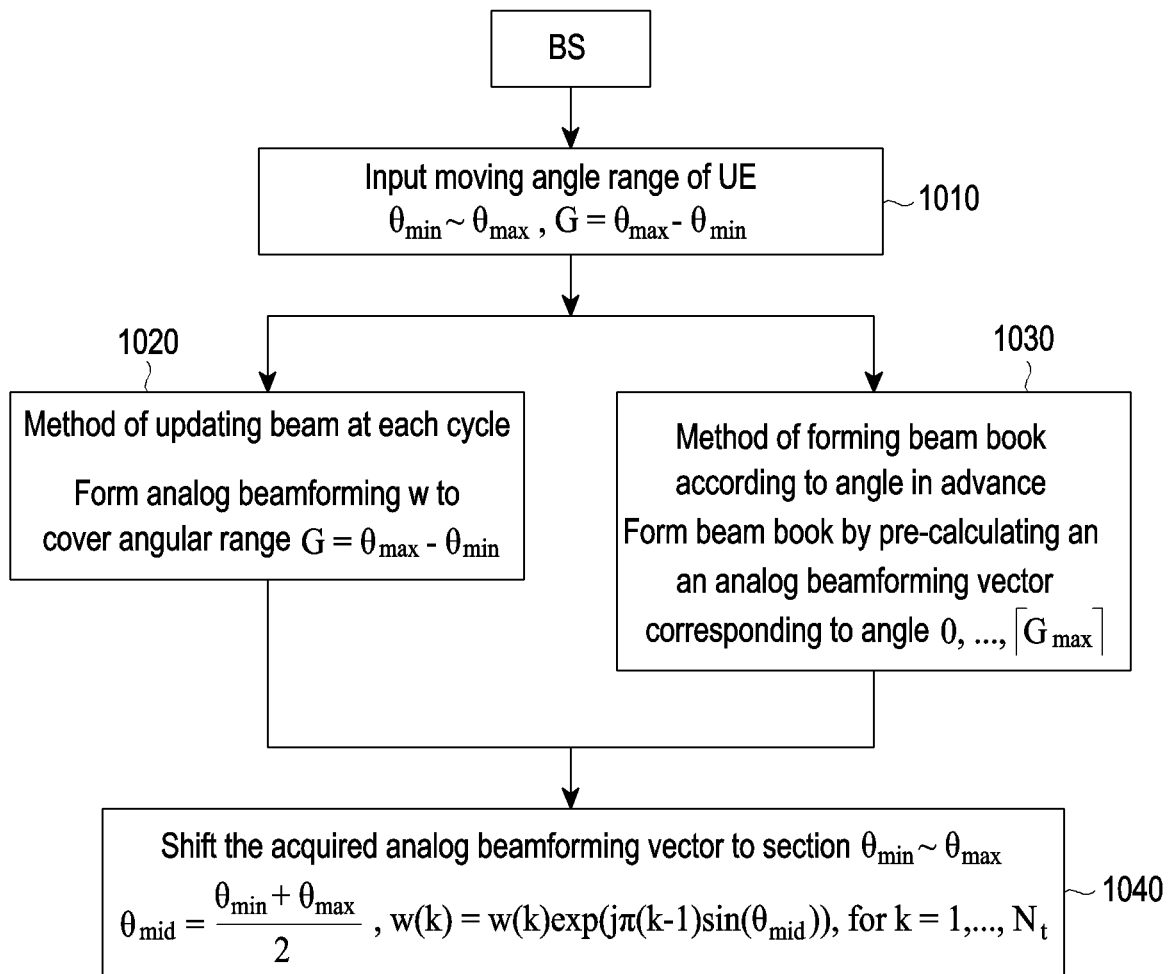
FIG. 10 is a flowchart schematically illustrating an operation in which a base station forms a beamforming vector in a communication system according to various embodiments of the present disclosure.

FIG. 10 is a flowchart schematically illustrating an operation in which a base station forms a beamforming vector w in a communication system according to various embodiments of the present disclosure.

Referring to FIG. 10, first, the base station inputs an angular range $\theta_{min} \sim \theta_{max}$ for covering the moving section of the terminal and an angular section $G = \theta_{min} - \theta_{max}$ for covering the moving section of the terminal (1010).

In various embodiments of the present disclosure, for example, the base station may form the beamforming vector w in one of two ways, and a first method is a method of forming a beamforming vector according to $G = \theta_{min} - \theta_{max}$ according to $\theta_{min} \sim \theta_{max}$ for each SSB update period (1020). Contrary to this, a second method may be divided into a method of pre-forming a beamforming vector book according to various angular ranges (1030).

The first method will be described in detail as follows (1020).

If $N_{res}$ angles of $G = \theta_{max} - \theta_{min}$ are sampled, the $i^{th}$ angle may be expressed as in Equation 13 below.

$$f_i = \overline{a}(\theta_i)^H w = a_i^H w, \qquad \text{Equation 13}$$

$$i = 1, \ldots, N_{res},$$

$$\theta_i = -\frac{G}{2} + G\frac{i-1}{N_{res}-1}$$

The $f_i$ in Equation 13 represents Equation within the absolute value of P2. At this time, if $f_i$ is decomposed into a real term and an imaginary term and expressed as a matrix, it can be expressed as in Equation 14 below.

$$\begin{bmatrix} R(f_i) \\ I(f_i) \end{bmatrix} = A_i x, \qquad \text{Equation 14}$$

$$A_i = \begin{bmatrix} R(a_i)^T & I(a_i)^T \\ -I(a_i)^T & R(a_i)^T \end{bmatrix},$$

-continued $$x = \begin{bmatrix} R(w) \\ I(w) \end{bmatrix},$$

$$x \in R^{2N_t \times 1}$$

Through the decomposition method above, $|f_i|^2$ can be expressed as in Equation 15 below.

$$|f_i|^2 = \qquad\qquad\qquad\qquad \text{Equation 15}$$

$$\begin{bmatrix} R(f_i) \\ I(f_i) \end{bmatrix}^T \begin{bmatrix} R(f_i) \\ I(f_i) \end{bmatrix} = x^T A_i^T A_i x = x^T Q_i x = Tr(x^T Q_i x) = Tr(Q_i X),$$

$$Q_i = A_i^T A_i,$$

$$X = x^T x,$$

$$X \geq 0,$$

$$\text{rank}(X) = 1$$

If $Q_i$ is expanded, it can be expressed as Equation 16 below.

$$Q_i = A_i^T A_i = \begin{bmatrix} R(a_i) & -I(a_i) \\ I(a_i) & R(a_i) \end{bmatrix} \begin{bmatrix} R(a_i)^T & I(a_i)^T \\ -I(a_i)^T & R(a_i)^T \end{bmatrix} = \qquad \text{Equation 16}$$

$$\begin{bmatrix} R(a_i)R(a_i)^T + I(a_i)I(a_i)^T & R(a_i)I(a_i)^T - I(a_i)R(a_i)^T \\ I(a_i)R(a_i)^T - R(a_i)I(a_i)^T & I(a_i)I(a_i)^T + R(a_i)R(a_i)^T \end{bmatrix}$$

If $D_n$ is defined as $$D_n,$$

$$n = 1, \ldots, N_t,$$

$$D_n(i, i) = \begin{cases} 1 & \text{if } i = n \\ 1 & \text{if } i = n + N_t, \; Tr(D_n, X) = 1, \\ 0 & \text{otherwise} \end{cases}$$

P2 in Equation 12 can be expressed as problem P2.1 in Equation 17 below.

$$(P\ 2.1)$$

$$\max_{\tau, X} \tau \qquad\qquad\qquad \text{Equation 17}$$

$$\text{s.t.}$$

$$Tr(Q_i X) \geq \tau,$$

$$\text{for } i = 1, \ldots, N_{res}$$

$$Tr(D_n X) = 1,$$

$$\text{for } i = 1, \ldots, N_t$$

$$X \geq 0,$$

$$\text{rank}(X) = 1$$

In Equation 17, $\tau$ represents the minimum value among $N_{res}$ received powers. The vector x can be extracted through eigenvalue decomposition from the matrix X obtained by solving P2.1 of Equation 17, and it is possible to recover the analog beamforming vector w from the relation of $$x = \begin{bmatrix} R(w) \\ I(w) \end{bmatrix}.$$

However, problem P2.1 becomes a non-convex problem due to rank(X)=1 constraint and is difficult to solve. Therefore, if the rank(X)=1 constraint of P 2.1 is released using semidefinite relaxation (hereinafter referred to as SDR), it can be expressed by Equation 18 below.

(P 2.2)

$$\max_{\tau,X} \tau \qquad\qquad \text{Equation 18}$$

s.t.

$$Tr(Q_i X) \geq \tau$$

for $i = 1, ..., N_{res}$ $$Tr(D_n X) = 1$$

for $i = 1, ..., N_t$ $$X \geq 0$$

For the simplification of P2.2 in Equation 18, if $Tr(Q_i X)$ is further expanded, it is expressed as Equation 19 below.

Equation 19

$$Tr(Q, X) = Tr\left(\begin{bmatrix} R(a_i)R(a_i)^T + I(a_i)I(a_i)^T & R(a_i)I(a_i)^T - I(a_i)R(a_i)^T \\ I(a_i)R(a_i)^T - R(a_i)I(a_i)^T & I(a_i)I(a_i)^T + R(a_i)R(a_i)^T \end{bmatrix}\right.$$

$$\begin{bmatrix} R(w)R(w)^T & R(w)I(w)^T \\ I(w)R(w)^T & I(w)I(w)^T \end{bmatrix} = Tr\left((R(a_i)R(a_i)^T + I(a_i)I(a_i)^T)R(w)R(w)^T + \right.$$

$$\left(R(a_i)I(a_i)^T - I(a_i)R(a_i)^T\right)I(w)R(w)^T +$$

$$\left(I(a_i)R(a_i)^T - R(a_i)I(a_i)^T\right)R(w)I(w)^T + \left(I(a_i)I(a_i)^T + R(a_i)R(a_i)^T\right)I(w)I(w)^T\right)$$

Since the beam pattern allocated by the base station has a symmetric shape (−G/2~G/2), the phase shape of the beamforming vector w should also be formed symmetrically. Therefore, a relationship of $\emptyset(n)=(N_t-(n-1))$ is created in the beamforming vector w phase, and therefore the beamforming vector w value should also be formed symmetrically as $w(n)=(N_t-n-1))$. Therefore, when $N_t$ is constrained to form an even and symmetrical beam pattern, in Equation 19, $$Tr((R(a_i)I(a_i)I(a_i)^T-I(a_i)R(a_i)^T)I(w)R(w)^T)=0$$

the element $Tr((I(a_i)R(a_i)^T-R(a_i)I(a_i)^T)R(w)I(w)^T)=0$ has a value of 0.

This means that $R(\alpha_i)I(\alpha_i)^T-I(\alpha_i)R(\alpha_i)^T$ has zero elements on the main diagonal, elements located symmetrically by the main diagonal have both the properties of an anti-symmetric matrix with opposite signs and the properties of a Toeplitz matrix, a square matrix in which the elements on the diagonal are the same, and the form of the matrix $I(w)R(w)^T$ takes the form of x-axis and y-axis symmetry due to the symmetry of w when the center of the matrix is viewed as the origin. Accordingly, a component having 0 among the components of $Tr(Q_i X)$ in Equation 19 exists due to the symmetry of the matrices. If defined as $\overline{Q}_i(\alpha_i)R(\alpha_i)^T+I(\alpha_i)I(\alpha_i)^T$ and defined as $Y=R(w)R(w)^T+I(w)I(w)^T$, since it is $Tr(Q_i X)=Tr((R(\alpha_i)R(\alpha_i)^T+I(\alpha_i)I(\alpha_i)^T)(R(w)R(w)^T+I(w)I(w)^T))=Tr(\overline{Q}_i Y)$, $Y\in R^{N_t\times N_t}$, it can be expressed as $Tr(\overline{Q}_i X)$, which is $Tr(\overline{Q}_i Y)=Tr(Q_i X)$.

When defined as $$\overline{D}_n,$$

$$n = 1, ..., N_t,$$

$$\overline{D}_n = \begin{cases} 1 & \text{if } i = n \\ 0 & \text{otherwise} \end{cases},$$

P2.2 in Equation 18 can be simplified to Equation 20 below.

(P 2.3)

$$\max_{\tau,Y} \tau \qquad\qquad \text{Equation 20}$$

s.t.

$$Tr(\overline{Q}_i Y) \geq \tau$$

for $i = 1, ..., N_{res}$ $$Tr(\overline{D}_n Y) = 1$$

for $i = 1, ..., N_t$ $$Y \geq 0$$

It can be changed to problem P2.3 of Equation 20. At this time, the rank(X)=1 constraint previously considered may be changed from $Y=R(w)R(w)^T+I(w)I(w)^T$ to rank(Y)≤2. When Y obtained from problem P 2.3 satisfies rank(Y)≤2, Y is the optimal solution.

If Y to be additionally obtained is forced to have a structure of $Y=R(w)R(w)^T+I(w)I(w)^T$, since the center of the matrix as the reference axis is symmetric with respect to the x-axis, y-axis, y=x, y=−x because of the symmetry of w, when a rotation matrix B is given as follows, Y may be expressed as in Equation 21 below.

$$Y = R(w)R(w)^T + I(w)I(w)^T = \begin{bmatrix} S & SB \\ BS & BSB \end{bmatrix}, \qquad \text{Equation 21}$$

$$S \in R^{\frac{N_t}{2} \times \frac{N_t}{2}},$$

$$S \geq 0,$$

$$B = \begin{bmatrix} 0 & 0 & \cdots & 0 & 1 \\ 0 & 0 & \cdots & 1 & 0 \\ \vdots & \vdots & \ddots & \vdots & \vdots \\ 0 & 1 & \cdots & 0 & 0 \\ 1 & 0 & \cdots & 0 & 0 \end{bmatrix}$$

Similarly, in the form of $\overline{Q}_i=R(\alpha_i)R(\alpha_i)^T+I(\alpha_i)I(a_i)^T$, since it is symmetric with respect to the x-axis, y-axis, and y=−x with respect to the center of the matrix, $Tr(\overline{Q}_i Y)$ can be expressed as $Tr(P_i S)$ as in Equation 22 below.

$$\overline{Q}_i = \begin{bmatrix} \overline{Q}_{1,i} & \overline{Q}_{2,i} \\ \overline{Q}_{2,i}^T & \overline{Q}_{1,i} \end{bmatrix} \qquad\qquad \text{Equation 22}$$

$$Tr(\overline{Q}_i Y) =$$

$$Tr\left(\begin{bmatrix} \overline{Q}_{1,i} & \overline{Q}_{2,i} \\ \overline{Q}_{2,i}^T & \overline{Q}_{1,i} \end{bmatrix}, \begin{bmatrix} S & SB \\ BS & BSB \end{bmatrix}\right) = Tr(\overline{Q}_{1,i}S + \overline{Q}_{2,i}BS + \overline{Q}_{2,i}^T SB + \overline{Q}_{1,i}BSB) =$$

$$TR((\overline{Q}_{1,i} + \overline{Q}_{2,i}B + B\overline{Q}_{2,i}^T + B\overline{Q}_{1,i}B)S) = Tr(P_i S),$$

-continued $$P_i = \overline{Q}_{1,i} + \overline{Q}_{2,i}B + B\overline{Q}_{2,i}^{\ T} + B\overline{Q}_{1,i}B$$

$$i = 1, \ldots, N_{res}$$

P2.3 of Equation 20 can be expressed as Equation 23 using $Tr(P_iS)$.

$$(P\,2.4)\ \max_{\tau,S}\ \tau \qquad\qquad \text{Equation 23}$$

$$\text{s.t } Tr(P_iS) \geq \tau \text{ for } i = 1, \ldots, N_{res}$$

$$Tr(\overline{D_n}S) = 1 \text{ for } i = 1, \ldots, \frac{N_t}{2}$$

$$S \geq 0$$

Since P2.4 in Equation 23 is a convex problem, it can be solved using the interior point method (hereinafter referred to as IPM). The Y can be restored to S obtained by solving P2.4 of Equation 23, and it is possible to recover w by assigning first and second eigenvectors obtained by eigenvalue decomposition of the Y matrix to the real and imaginary parts of the analog beamforming vector w, respectively.

Meanwhile, the second method will be described in detail as follows (1030).

The second problem solving method is to preform a beamforming vector book according to various angle ranges. When $v_{max}$ is the maximum speed allowed within the moving section of the terminal, the angular section $G_{max}$ for the base station to cover the moving section of the terminal according to the mobility of the terminal within the section, based on 0 degrees where the base station and the terminal are closest, i.e., the mobility of the terminal with respect to the base station is greatest, can be expressed in Equation 24 below (1040).

$$G_{max} = 2\arctan\left(\frac{v_{max}T}{2d_0}\right) \qquad\qquad \text{Equation 24}$$

Based on the $G_{max}$ in Equation 24, a beam book having a specific resolution (e.g., 1 degree difference, 0, 1, 2, 3, ..., $\lceil G_{max} \rceil$ may be formed in advance by the base station to cover the degree from 0 degree. With respect to the angular section $G = \theta_{max} - \theta_{min}$ for the base station to cover the moving section of the terminal, the analog beamforming vector w made to cover the angular section closest to G, for example, an angle obtained through rounding, can be taken out of the preformed beam book and utilized (1050).

For convenience, assuming a specific resolution of 1 degree, the beamforming vector w obtained by solving the problem of maximizing received power for section $$-\frac{G}{2} \sim \frac{G}{2}$$

for an arbitrary angular section G between 0, 1, 2, 3, ..., $\lceil G_{max} \rceil$ is pre-allocated as a beam for the angular section G in the beam forming vector book (1060).

In order to solve P2 in Equation 12, if $N_{res}$ angles within $$-\frac{G}{2} \sim \frac{G}{2}$$

are sampled, the $i^{th}$ angle can be expressed as in Equation 25 below.

$$\theta_i = -\frac{G}{2} + G\frac{i-1}{N_{res}-1} \qquad\qquad \text{Equation 25}$$

A beamforming vector w having a phase $\phi$ may be expressed as in Equation 26 below.

$$w = \frac{t}{\sqrt{N_t}}\left[e^{j\phi_1}\,e^{j\phi_2}\,\ldots\,e^{j\phi_{N_t}}\right]^T,\ -\pi \leq \phi_k \leq \pi \qquad \text{Equation 26}$$

The array response vector $\overline{a}(\theta_i)$ may be expressed as Equation 27 below.

$$\overline{a}(\theta_i) = \frac{1}{\sqrt{N_t}}\left[1\,e^{j\pi\sin\theta_i}\ldots\,e^{j\pi(N_t-1)\sin\theta_i}\right]^T = \qquad \text{Equation 27}$$

$$\frac{1}{\sqrt{N_t}}\left[e^{ja_{1,i}}e^{ja_{2,i}}\ldots\,e^{ja_{N_t,i}}\right]^T,$$

$$a_{k,i} = \pi(k-1)\sin\theta_i$$

$$a(\theta_i) = \sqrt{N_t}\,\overline{a}(\theta_i),$$

$$\overline{w} = \sqrt{N_t}\,w,$$

$$O_i = |a(\theta_i)^H\overline{w}|^2,$$

$$i = 1, \ldots, N_{res}$$

P2 of Equation 12 is a problem of obtaining the phase $\phi$ of the analog beamforming vector w, and can be expressed as Equation 28 below.

$$(P2a)\max_{\phi}\ \min_{i}\frac{1}{N_t}O_i \qquad\qquad \text{Equation 28}$$

In P 2A of Equation 28, $N_t$ represents the number of antenna elements and is a constant, and therefore, a second problem solving method is to obtain a phase $\phi$ that maximizes the minimum value of $O_i$, When $b_{k,i}=\phi_k-a_{k,i}$ is defined, $O_i$ can be expressed by the following Equation 29.

$$O_i = |a(\theta_i)^H\overline{w}|^2 = \left|e^{j(\phi_1-a_{1,i})}e^{j\phi_2-a_{2,i}}\ldots\,e^{j\phi_{N_t}-a_{N_t,i}}\right|^2 = \qquad \text{Equation 29}$$

$$|\cos(b_{1,i}) + \cos(b_{2,i}) + \ldots + \cos(b_{N,i}) + j\sin(b_{1,i}) +$$

$$j\sin(b_{2,i}) + \ldots + j\sin(b_{N_t,i})|^2 = N_t +$$

$$2(\cos(b_{1,i} - b_{2,i}) + \cos(b_{1,i} - b_{3,i}) + \ldots + \cos(b_{N_t-1,i} - b_{N_t,i}))$$

That is, $O_i$ is expressed as the sum of cosine functions. However, the sum of the cosine functions is not concave, so it is difficult to solve. Therefore, for the analysis of the cosine function, a successive convex approximation (hereinafter referred to as SCA) method is introduced. The SCA method is a method that finds a surrogate function of the original function, based on the value of the variable obtained in the $1^{th}$ iteration, finds the variable that maximizes the function, and repeatedly updates the function. In order to utilize this SCA method, the convex lower bound of the cosine function can be obtained as shown in Equation 30 below.

$$\cos x^{l+1} \geq g\left(x^{l+1} \mid x^l\right) = -\frac{\left(x^{l+1} - x^l + \sin x^l\right)^2}{2} + \cos x^l + \frac{\sin^2 x^l}{2}, \quad \text{Equation 30}$$

$$-1 \leq g\left(x^{l+1} \mid x^l\right) \leq 1$$

If the convex lower bound of the cosine function of Equation 30 is utilized, $O_i$ has a convex lower bound as shown in Equation 31 below as an auxiliary function in the $(l+1)^{th}$ iteration.

$$O_i = |a(\theta_i)^H \overline{w}|^2 \geq N_t + 2(g(b_{1,i}^{l+1} - b_{2,i}^{l+1} \mid b_{1,i}^l - b_{2,i}^l) + g(b_{1,i}^{l+1} - b_{3,i}^{l+1} \mid b_{1,i}^l - b_{3,i}^l) + \ldots + g(b_{N_t-1,i}^{l+1} - b_{N_t,i}^{l+1} \mid b_{N_t-1,i}^l - b_{N_t,i}^l)) \quad \text{Equation 31}$$

Therefore, through the SCA method, the phase ø of the analog beamforming vector w of the base station can be obtained by iteratively solving the approximated problem P2b of Equation 32 below.

$$(P2b): \max_{\phi} \min_{i} \frac{1}{N_t} N_t + 2(g(b_{1,i}^{l+1} - b_{2,i}^{l+1} \mid b_{1,i}^l - b_{2,i}^l) + \quad \text{Equation 32}$$

$$g(b_{1,i}^{l+1} - b_{3,i}^{l+1} \mid b_{1,i}^l - b_{3,i}^l) +$$

$$\ldots + g(b_{N_t-1,i}^{l+1} - b_{N_t,i}^{l+1} \mid b_{N_t-1,i}^l - b_{N_t-1,i}^l))$$

Since P2b in Equation 32 is a convex problem with respect to ø, it can be solved using a well-known IPM. After allocating $\{\phi_k=0, \forall k\}$ as the initial value of the phase, the phase $\{\phi_k, \forall k\}$ obtained by repeatedly solving P2b of Equation 32 approximated until the object converges can be substituted into the analog beamforming vector w to obtain $$w = \frac{t}{\sqrt{N_t}}\left[e^{j\phi_1} e^{j\phi_2} \ldots e^{j\phi_{N_t}}\right]^T, \ -\pi \leq \phi_k \leq \pi.$$

That is, after obtaining the analog beamforming vector w in advance through the above method for $0 \sim \rfloor G_{max}\lceil, \lceil G_{max}\rfloor +1$: angles, when the SSB index is updated in each cycle, it is possible to find the beam width (e.g., rounding, etc.) close to the beam width $G=\theta_{max}-\theta_{min}$ to be covered and take the same out from the beamforming vector book and utilize the same.

Through the above two methods, it is possible to obtain an analog beamforming vector w for section $$-\frac{G}{2} \sim \frac{G}{2}$$

when it is $G=\theta_{max}-\theta_{min}$, and it is possible to process and use the analog beamforming vector by phase shifting the same to section $\theta_{min} \sim \theta_{max}$, which was originally considered. It can be seen that the center of the section under consideration is $$\theta_{mid} = \frac{\theta_{max} + \theta_{min}}{2},$$

and when the $k^{th}$ element of the analog beamforming vector w is w(k), the gastric acid shift is performed as in Equation 33 below (1070).

$$w'(k) = w(k)e^{j\pi(k-1)\sin(\theta_{mid})}, \text{for } k=1, \ldots, N_t \quad \text{Equation 33}$$

Finally, the analog beamforming vector w' transitioned to the section $\theta_{min} \sim \theta_{max}$ in consideration of the mobility of the terminal is used as an information transmission beam for the terminal in the base station during the nth SSB update section.

Figure 11:
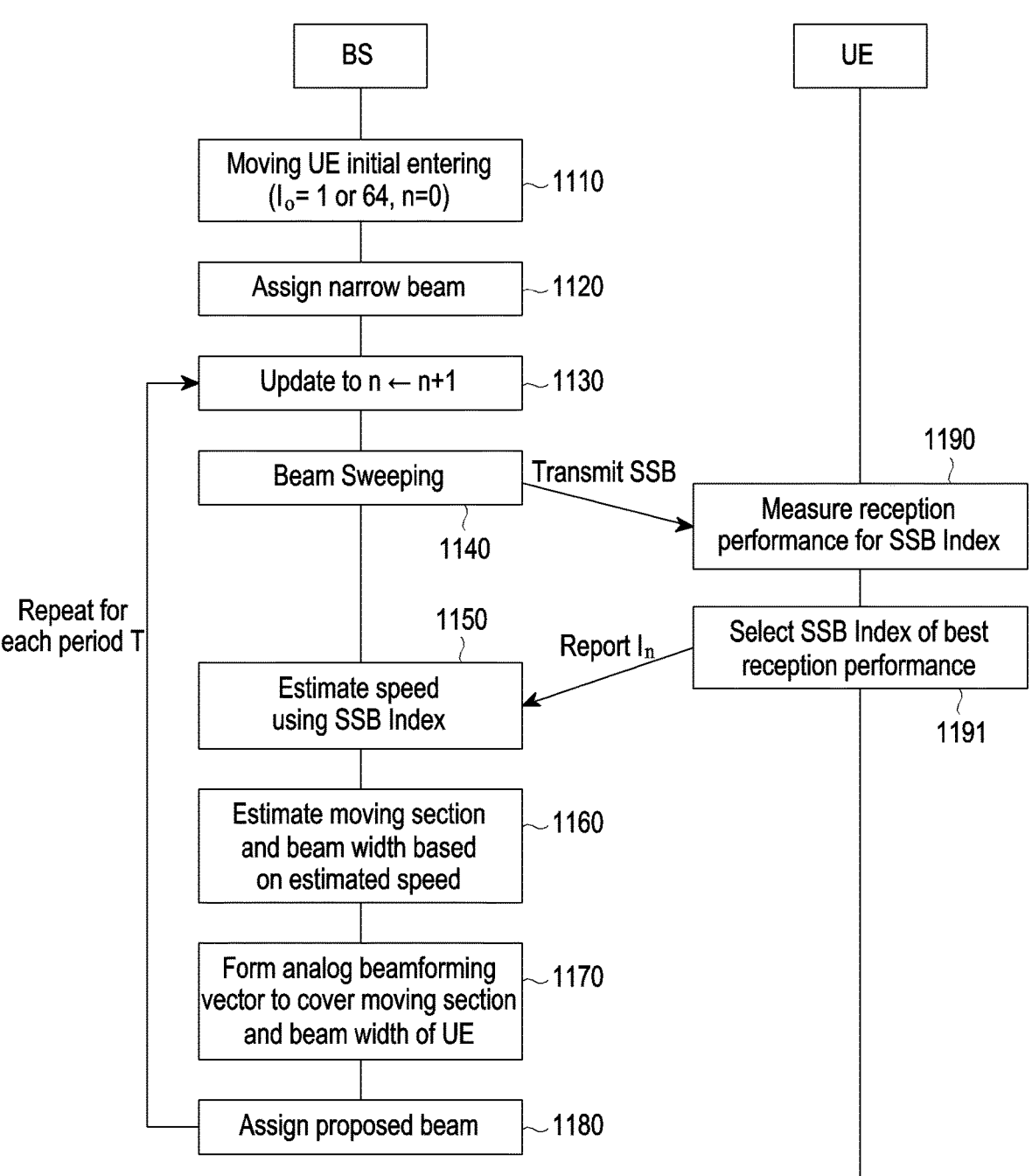
FIG. 11 is a signal flow diagram schematically illustrating operations of a base station and a terminal for efficiently operating a beam in a communication system according to various embodiments of the present disclosure.

FIG. 11 is a signal flow diagram schematically illustrating operations of a base station and a terminal for efficiently operating a beam in a communication system according to various embodiments of the present disclosure.

Referring to FIG. 11, first, the base station detects that the terminal enters the coverage area covered by the base station. In this case, the value of $I_0$ is set to 1 or 64, for example, according to the moving direction of the terminal ($I_0=1$ or $I_0=64$). Here, $I_n$ represents the SSB index reported by the terminal to the base station in the nth SSB update interval n. In various embodiments of the present disclosure, when the terminal first enters the coverage area of the base station, the value of $I_0$ is set to 1 or 64 as an example, when the terminal moves in the first direction, the value of $I_0$ is set to 1, and when the terminal moves in the second direction, the value of $I_0$ is set to 64, for example. In addition, the value of n is set to a default value, for example, 0 (1110).

The base station allocates the SSB index corresponding to the value of $I_0$ to the terminal. That is, the base station allocates a narrow beam corresponding to the value of $I_0$ to the terminal (1120). Here, since the base station allocates a beam to the terminal, the variable n is increased by a set value, for example, 1. That is, the base station updates the variable n to n+1 (1130). The base station transmits SSBs via a beam sweeping process (1140). The terminal measures reception performance for SSBs transmitted from the base station through a beam sweeping process (1190). Here, the reception performance for the SSB may be, for example, reception power.

The terminal reports the SSB index of a specific SSB among the measured SSBs, for example, the SSB with the best reception performance, to the base station (1191). The base station receives the SSB index from the terminal, and estimates the speed of the terminal, based on the received SSB index. (1150). The base station estimates a movement interval of the terminal, based on the estimated speed of the terminal (1160). The base station forms an analog beamforming vector for the terminal, based on the estimated movement interval (1170). Here, the method of forming the analog beamforming vector may be either 'a method of forming an analog beamforming vector for each SSB update period' or 'a method of forming an analog beamforming vector, based on a set beam book'. The base station allocates a beam suitable for the terminal, based on the formed analog beamforming vector (1180). Operations 1130 to 1180 may be repeatedly performed for each SSB update period. Alternatively, the SSB update may not be periodically performed, but may be performed aperiodically according to the needs of the terminal or according to the instruction of the base station.

FIG. 12 is a diagram illustrating parameters used in simulation for performance verification of a beam operation method according to various embodiments of the present disclosure.

Referring to FIG. 12, the distance $d_1$ between the ground and the road on which the base station is installed is configured to 5 m, and the height $d_2$ the height of the base station, is configured to 10 m. The maximum value of the SSB index is configured to 64, and the SSB update period T is configured to 40 ms. The speed v of the terminal is configured to 50 m/s, the number $N_t$ of the base station's antenna elements is configured to 32, and the number of angular section samplings $N_{res}$ is configured to 40, and simulation is performed.

Figure 13A:
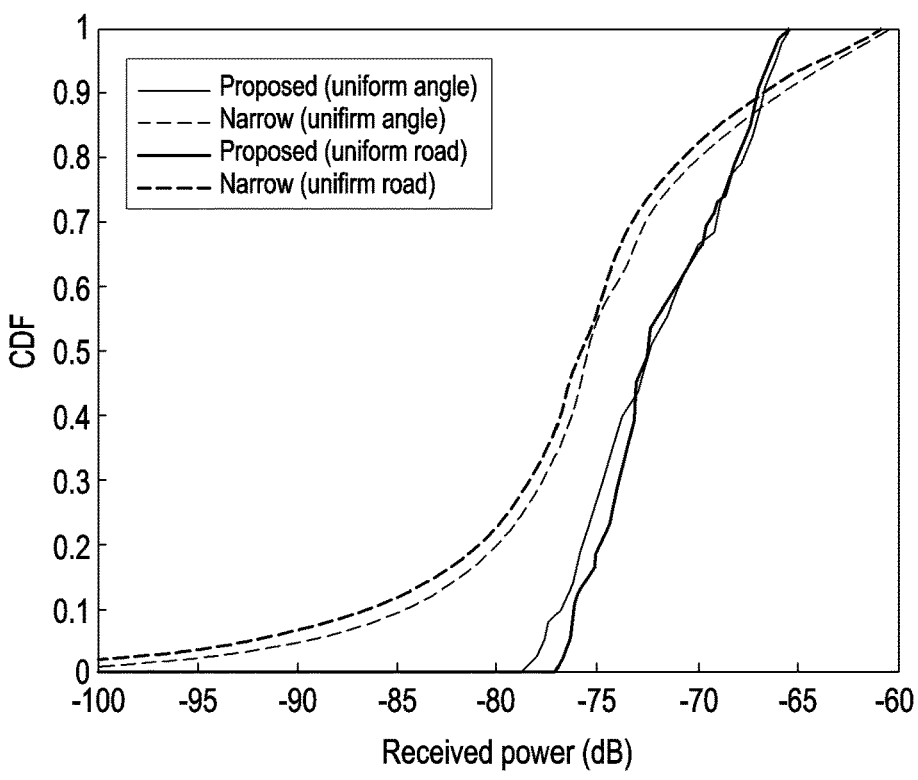
FIGS. 13A, 13B, and 13C illustrate simulation results of a beam operation method in a communication system according to various embodiments of the present disclosure.

FIG. 13A illustrates a simulation result of a beam operation method in a communication system according to various embodiments of the present disclosure.

Referring to FIG. 13A, a received power cumulative distribution function (CDF) is shown for a difference in reception power received by the terminal according to a method of allocating a narrow beam and a method of allocating a beam according to an embodiment of the present disclosure. The method of allocating the narrow beam is a beam allocation method according to the prior art, and the received power is measured by dividing the road section covered by the base station according to the uniform angle method or the uniform road method. The proposed method is a beam allocation method according to an embodiment of the present disclosure, and received power is measured by dividing a road section covered by a base station according to a uniform angle method or a uniform road method. The difference in received power according to the uniform angle method or the uniform road method is not large. However, the reception power of the beam allocation according to the prior art deteriorates in performance due to the occurrence of beam mismatch due to mobility, whereas the reception power according to the beam allocation method of the present disclosure covers the moving section to ensure a relatively high minimum reception power.

Figure 13B:
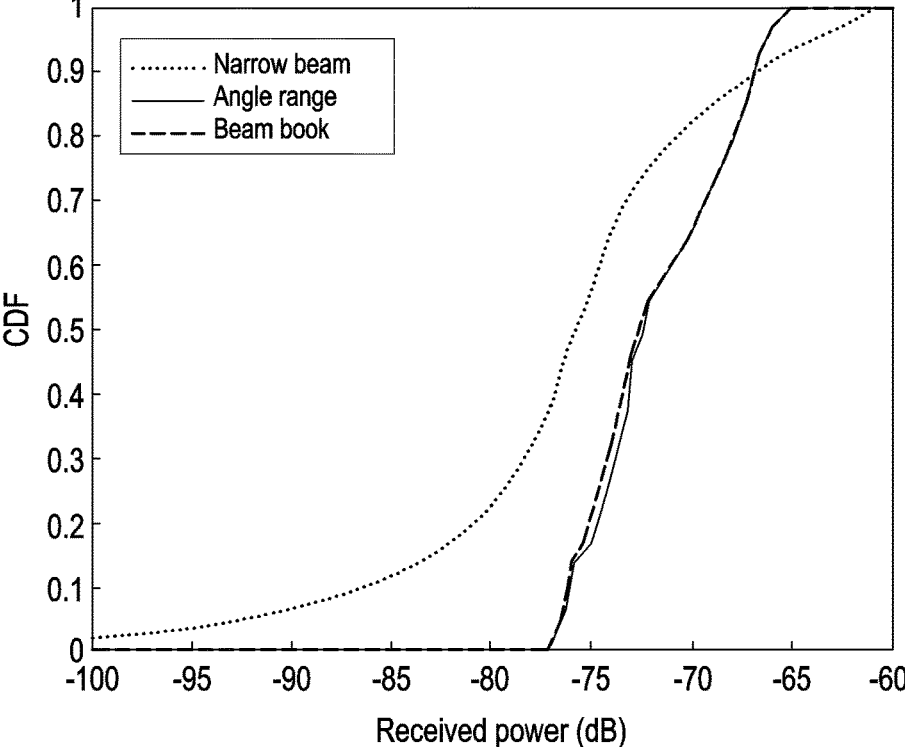

FIG. 13B illustrates a simulation result of a beam operation method according to various embodiments of the present disclosure.

Referring to FIG. 13B, the received power CDF according to each of the prior art beam allocation method, the method of updating the beam forming vector for each period, and the method of forming the beam forming vector by forming a beam book according to the angle in advance is shown. The method of forming a beamforming vector for each update period and the method of forming a beamforming vector using a beam book do not show a significant difference in received power. However, the beam allocation method according to the prior art and the method of forming and using a beam forming vector show a difference in minimum reception power.

Figure 13C:
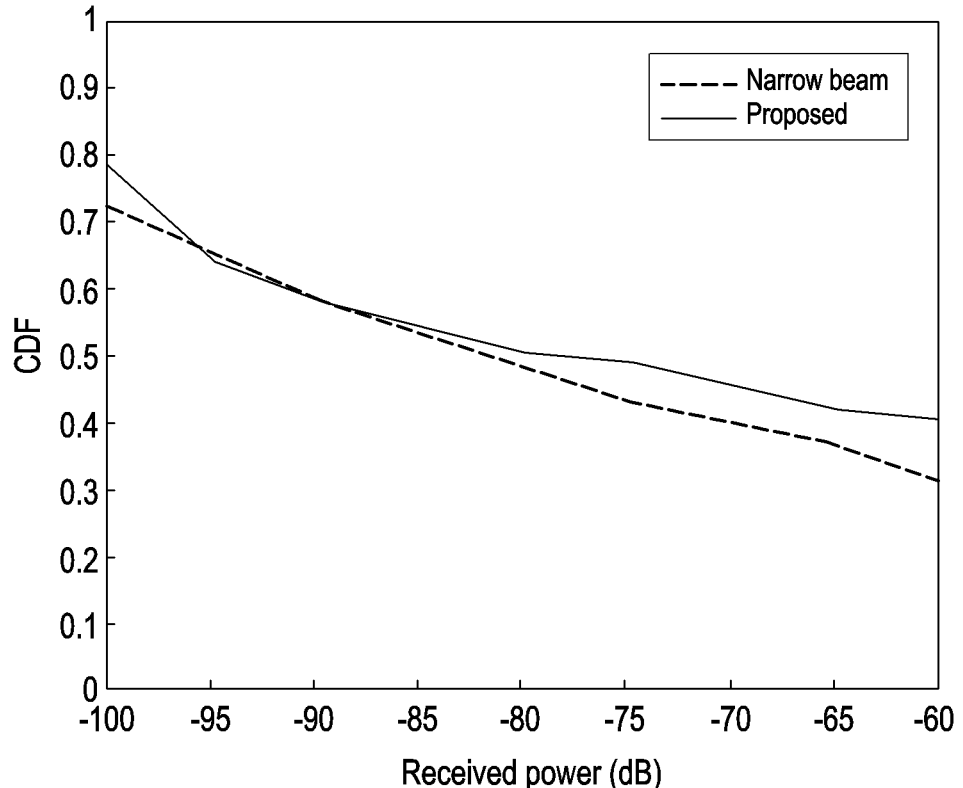

FIG. 13C illustrates a simulation result of a beam operation method according to various embodiments of the present disclosure.

Referring to FIG. 13C, the relationship between the speed of the terminal and the average received power is shown. The received power was measured by dividing the road section covered by the base station according to the method of allocating a narrow beam and the proposed method. Referring to FIG. 13C, it can be seen that the performance of the beam allocation method according to the proposed method is better than the performance of the narrow beam allocation method according to the average received power according to the speed of the terminal.

Figure 14:
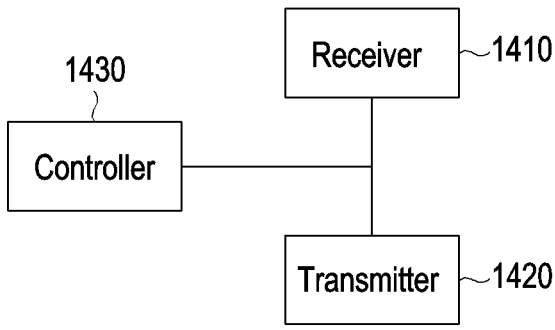
FIG. 14 is a diagram schematically illustrating an internal structure of a base station in a communication system according to various embodiments of the present disclosure.

FIG. 14 is a diagram schematically illustrating an internal structure of a base station in a communication system according to various embodiments of the present disclosure.

Referring to FIG. 14, a base station 1400 includes a receiver 1410, a transmitter 1420, and a controller 1430.

The controller 1430 controls the overall operation of the base station 1400, in particular, controls to perform an operation related to the operation of controlling the beam allocation. Since the operation of the controller 1430 to control the beam operation is the same as described with reference to FIGS. 6 to 11, a detailed description thereof will be omitted herein.

The receiver 1410 receives various messages and information under the control of the controller 1430.

The transmitter 1420 transmits various messages and information under the control of the controller 1430.

In FIG. 14, the receiver 1410, the transmitter 1420, and the controller 1430 are implemented as separate units, but at least two of the receiver 1410, the transmitter 1420, and the controller 1430 may be integrated into one. In addition, the receiver 1410, the transmitter 1420, and the controller 1430 may be implemented with at least one processor.

Figure 15:
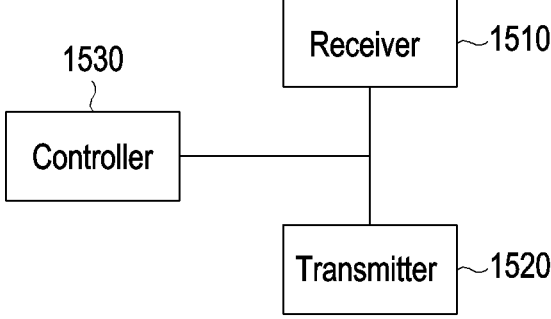
FIG. 15 is a diagram schematically illustrating an internal structure of a terminal in a communication system according to various embodiments of the present disclosure.

FIG. 15 is a diagram schematically illustrating an internal structure of a terminal in a communication system according to various embodiments of the present disclosure. Referring to FIG. 15, a terminal 1500 includes a receiver 1510, a transmitter 1520, a controller 1530, and the like.

The controller 1530 controls the overall operation of the terminal 1500, in particular, controls to perform an operation related to the operation of controlling the beam allocation. The operation of controlling the operation related to this beam allocation of the controller 1530 is the same as described with reference to FIGS. 6 to 11, and thus a detailed description thereof will be omitted herein.

The receiver 1510 receives various messages and information under the control of the controller 1530.

The transmitter 1520 transmits various messages and information under the control of the controller 1530.

In FIG. 15, the receiver 1510, the transmitter 1520, and the controller 1530 are implemented as separate units, but at least two of the receiver 1510, the transmitter 1520, and the controller 1530 are integrated into one. In addition, the receiver 1510, the transmitter 1520, and the controller 1530 may be implemented with at least one processor.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

According to an embodiment, a method of a terminal in a communication system may include receiving synchronization signal blocks (SSBs) from a base station, selecting an SSB among the SSBs and transmitting SSB index of the selected SSB to the base station, and receiving, from the base station, a signal transmitted based on a beamforming vector determined correspond to the selected SSB, wherein the beamforming vector is configured based on a moving section of the terminal, the moving section being estimated based on a speed of the terminal, the speed being estimated based on the SSB index and a location of the terminal, and the location of the terminal is estimated based on the SSB index.

According to an embodiment, it may be characterized in that the beamforming vector is a second beamforming vector in which a phase shift operation is performed on a first beamforming vector detected based on a movement period of the terminal.

According to an embodiment, it may be characterized in that the beamforming vector is a second beamforming vector in which a phase shift operation is performed on a first beamforming vector detected corresponding to a moving section of the terminal in a configured beamforming vector book.

According to an embodiment, a terminal in a communication system may include a transceiver for receiving synchronization signal blocks (SSBs) from a base station, transmitting an SSB index of an SSB selected from among the SSBs, and receiving a signal transmitted from the base station, based on a beamforming vector determined corresponding to the selected SSB, and a controller that selects a specific SSB among the SSBs, wherein the beamforming vector is configured based on the moving section of the terminal estimated based on the speed of the terminal estimated based on the SSB index and the location of the terminal, and the location of the terminal is estimated based on the SSB index.

According to an embodiment, the beamforming vector may be a second beamforming vector in which a phase shift operation is performed on a first beamforming vector detected based on a movement period of the terminal.

According to an embodiment, the beamforming vector may be a second beamforming vector in which a phase shift operation is performed on a first beamforming vector detected corresponding to a moving section of the terminal in a configured beamforming vector book.

The invention claimed is:

1. A method of a base station in a communication system, the method comprising:

transmitting synchronization signal blocks (SSBs) allocated based on deployment information of the base station, an angle covered by each sector of the base station, and a number of SSB indices;

receiving, from a terminal, an SSB index of an SSB selected from among the SSBs;

estimating a location of the terminal, based on the SSB index and a unit angle obtained by dividing the angle covered by each sector of the base station by the number of SSB indices;

estimating a speed of the terminal, based on the SSB index and the location of the terminal;

estimating a moving section of the terminal, based on the speed of the terminal; and configuring a beamforming vector for the terminal, based on the moving section of the terminal.

2. The method of claim 1, wherein the estimating of the speed of the terminal, based on the SSB index and the location of the terminal, comprises:

estimating the speed of the terminal based on a difference between a first location of the terminal estimated based on a first SSB index received from the terminal in a first SSB update section and a second location of the terminal estimated based on a second SSB index received from the terminal in a second SSB update section different from the first SSB update section.

3. The method of claim 1, wherein the configuring of a beamforming vector for the terminal, based on the moving section of the terminal, comprises:

detecting a first beamforming vector, based on the moving section of the terminal, performing a phase shift operation on the detected first beamforming vector to detect a second beamforming vector, and configuring the second beamforming vector as the beamforming vector.

4. The method of claim 1, wherein the configuring of a beamforming vector for the terminal, based on the moving section of the terminal, comprises:

detecting a first beamforming vector corresponding to the moving section of the terminal, based on a set beamforming vector book, performing a phase shift operation on the detected first beamforming vector to detect a second beamforming vector, and configuring the second beamforming vector as the beamforming vector.

5. A base station in a communication system, comprising:

a transceiver configured to transmit synchronization signal blocks (SSBs) allocated based on deployment information of the base station, an angle covered by each sector of the base station, and a number of SSB indices, and receiving, from a terminal, an SSB index of an SSB selected from among the SSBs; and a controller configured to:

estimate a location of the terminal, based on the SSB index and a unit angle obtained by dividing the angle covered by each sector of the base station by the number of SSB indices, estimate a speed of the terminal, based on the SSB index and the location of the terminal, estimate a moving section of the terminal, based on the speed of the terminal, and configure a beamforming vector for the terminal, based on the moving section of the terminal.

6. The base station of claim 5, wherein the controller is configured to estimate the speed of the terminal based on a difference between a first location of the terminal estimated based on a first SSB index received from the terminal in a first SSB update section and a second location of the terminal estimated based on a second SSB index received from the terminal in a second SSB update section different from the first SSB update section.

7. The base station of claim 5, wherein the controller is configured to detect a first beamforming vector, based on the moving section of the terminal, perform a phase shift operation on the detected first beamforming vector to detect a second beamforming vector, and configure the second beamforming vector as the beamforming vector.

8. The base station of claim 5, wherein the controller is configured to detect a first beamforming vector corresponding to the moving section of the terminal, based on a set beamforming vector book, perform a phase shift operation on the detected first beamforming vector to detect a second beamforming vector, and configure the second beamforming vector as the beamforming vector.

9. A method of a terminal in a communication system, the method comprising:

receiving synchronization signal blocks (SSBs) from a base station;

selecting an SSB among the SSBs and transmitting, to the base station, an SSB index of the selected SSB; and receiving a signal transmitted from the base station, based on a beamforming vector determined correspond to the selected SSB, wherein the beamforming vector is configured based on a moving section of the terminal, the moving section being estimated based on a speed of the terminal, the speed being estimated based on the SSB index and a location of the terminal, and wherein the location of the terminal is estimated based on the SSB index and a unit angle obtained by dividing an angle covered by each sector of the base station by a number of SSB indices.

10. A terminal in a communication system, comprising:

a transceiver configured to receive synchronization signal blocks (SSBs) from a base station, transmit an SSB index of an SSB selected from among the SSBs, and receive a signal transmitted from the base station, based on a beamforming vector determined corresponding to the selected SSB; and a controller configured to select a specific SSB among the SSBs, wherein the beamforming vector is configured based on a moving section of the terminal estimated based on a speed of the terminal, the speed being estimated based on the SSB index and a location of the terminal, and wherein the location of the terminal is estimated based on the SSB index and a unit angle obtained by dividing an angle covered by each sector of the base station by a number of SSB indices.

11. The terminal of claim 10, wherein the SSBs are allocated based on deployment information of the base station, the angle covered by each sector of the base station, and the number of SSB indices.

\* \* \* \* \*